United States Patent
Shinoda et al.

(10) Patent No.: US 10,877,442 B2
(45) Date of Patent: Dec. 29, 2020

(54) MACHINE LEARNING DEVICE, CONTROL DEVICE, AND MACHINE LEARNING METHOD

(71) Applicant: FANUC CORPORATION, Yamanashi (JP)

(72) Inventors: Shougo Shinoda, Yamanashi (JP); Ryoutarou Tsuneki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 12 days.

(21) Appl. No.: 16/374,088

(22) Filed: Apr. 3, 2019

(65) Prior Publication Data

US 2019/0317457 A1 Oct. 17, 2019

(30) Foreign Application Priority Data

Apr. 13, 2018 (JP) ................................ 2018-077558

(51) Int. Cl.
*G05B 13/02* (2006.01)
*G05B 19/4063* (2006.01)

(52) U.S. Cl.
CPC ..... *G05B 13/0265* (2013.01); *G05B 19/4063* (2013.01); *G05B 2219/34082* (2013.01)

(58) Field of Classification Search
None
See application file for complete search history.

(56) References Cited

U.S. PATENT DOCUMENTS

| | | | | |
|---|---|---|---|---|
| 4,852,018 A | * | 7/1989 | Grossberg | B25J 9/163 700/259 |
| 6,628,576 B1 | * | 9/2003 | Watanabe | G11B 7/08505 369/30.15 |
| 8,767,343 B1 | * | 7/2014 | Helmick | G11B 5/5547 360/78.04 |
| 2004/0254762 A1 | * | 12/2004 | Hopkins | H01L 21/67288 702/182 |
| 2005/0103312 A1 | * | 5/2005 | Uchiyama | F02M 63/0225 123/457 |
| 2006/0164666 A1 | * | 7/2006 | Chun | G03G 15/6564 358/1.12 |

(Continued)

FOREIGN PATENT DOCUMENTS

JP 2006-215732 8/2006

*Primary Examiner* — Jason Lin
(74) *Attorney, Agent, or Firm* — Wenderoth, Lind & Ponack, L.L.P.

(57) ABSTRACT

Provided is a machine learning device configured to perform machine learning related to optimization of a compensation value of a compensation generation unit with respect to a servo control device configured to control a servo motor configured to drive an axis of a machine tool, a robot, or an industrial machine, and that includes at least one feedback loop, a compensation generation unit configured to generate a compensation value to be applied to the feedback loop, and an abnormality detection unit configured to detect an abnormal operation of the servo motor, wherein, during a machine learning operation, when the abnormality detection unit detects an abnormality, the compensation from the compensation generation unit is stopped and the machine learning device continues optimization of the compensation value generated by the compensation generation unit.

12 Claims, 12 Drawing Sheets

(56) References Cited

U.S. PATENT DOCUMENTS

| | | | |
|---|---|---|---|
| 2006/0173573 A1* | 8/2006 | Hosokawa | G05B 19/404 |
| | | | 700/193 |
| 2006/0265116 A1* | 11/2006 | Ozaki | F02D 41/1495 |
| | | | 701/109 |
| 2015/0362910 A1* | 12/2015 | Makino | G05B 19/402 |
| | | | 700/186 |
| 2017/0212507 A1* | 7/2017 | Naito | G05B 19/4188 |
| 2018/0231943 A1* | 8/2018 | Namie | G05B 15/02 |

\* cited by examiner

MACHINE LEARNING DEVICE, CONTROL DEVICE, AND MACHINE LEARNING METHOD This application is based on and claims the benefit of priority from Japanese Patent Application No. 2018-077558, filed on 13 Apr. 2018, the content of which is incorporated herein by reference.

BACKGROUND OF THE INVENTION

Field of the Invention

The present invention relates to a machine learning device that performs machine learning related to optimization of a compensation value of a compensation generation unit with respect to a servo control device including at least one feedback loop and a compensation generation unit that generates compensation to be applied to the feedback loop, a control device including the machine learning device, and a machine learning method.

Related Art

A servo control device that includes a feedback loop and applies compensation to the feedback loop is disclosed in Patent Document 1, for example.

Patent Document 1 discloses a numerical controller that diminishes wasting of a work due to machining until a position error based on learning constol converges and enables automatic storing of compensation data as well as performing of actual machining. Specifically, the numerical controller includes a learning control means which includes a position feedback loop in which a position error is generated, and which creates and stores compensation data based on a position error in the same operation pattern and compensates the position error during execution of the same operation pattern based on the compensation data. The numerical controller shifts a tool and a tool from a position commanded by a program to a position at which the tool and the work do not interfere and automatically repeats an idle operation in the same operation pattern for a designated number of times or until the position error is equal to or smaller than a designated value to create the compensation data. After the compensation data is created, the numerical controller automatically stores the compensation data, cancels the shifting so that the tool and the work return to the commanded position at which the tool and the work interfere, and based on the created compensation data, compensates the position error, executes the same operation pattern, and performs machining.

Patent Document 1: Japanese Unexamined Patent Application, Publication No. 2006-215732

SUMMARY OF THE INVENTION

In a servo control device that has a feedback loop and generates compensation to be applied to the feedback loop based on a position error or the like, when a generated compensation value is not in an appropriate range and the position error increases, the operation of a machine tool, a robot, or an industrial machine driven by the servo control device may become unstable, and the machine tool or the like may be stopped or shut down due to an alarm. For example, when a compensation value is learned while actually operating a machine tool instead of an idle operation, if the compensation value is not in an appropriate range, vibration may occur at the moter or the maching point, thereby hindering effective learning, or the machine tool or the like may be stopped or shut down due to an alarm, thereby interrupting the learning. In this regard, in the learning control disclosed in Patent Document 1, compensation data is generated by repeating an idle operation; therefore, during the learning control based on the idle operation, there is no possibility of vibration occurring at the moter or the maching point to hinder effective learning, nor of the machine tool or the like stopping or shutting down due to an alarm to result in the learning being interrupted. On the other hand, when the compensation to be applied to the feedback loop is generated using a high-order transfer function to be described later, a method in which a machine learning device calculates the coefficients of the transfer function by machine learning while operating the machine tool actually may be used. As an example of such a learning method, a machine learning method of learning the coefficients of a transfer function according to reinforcement learning may be used. Reinforcement learning is a form of so-called unsupervised learning in which when an agent observes the state of the environment and selects a certain action, the environment changes based on the action, a certain reward is given according to the change in the environment, and the agent learns a better selection (decision) of action. When the coefficients of the transfer function are machine-learned by such reinforcement learning and a state of the environment is a position error, if a coefficient that increases the position error is selected, there is a possibility that vibration occurs at the moter or the maching point, thereby hindering effective learning, or the machine tool or the like is stopped or shut down due to an alarm, thereby interrupting the learning. Therefore, what is needed is a machine learning device capable of continuing machine learning in a case where the machine learning device machine-learns compensation values while actually operating a machine tool so that, even when an inappropriate compensation value is selected, situations where vibration occurs at a moter or a maching point, thereby hindering effective learning, or where a machine tool or the like is stopped or shut down due to an alarm, thereby interrupting the learning, are prevented, as well as a control device including the machine learning device, and a machine learning method.

An object of the present invention is to provide a machine learning device with respect to a servo control device including at least one feedback loop and a compensation generation unit that generates compensation to be applied to the feedback loop, which is adopted when a calculation equation of a compensation value of the compensation generation unit is machine-learned while actually operating a machine tool, a robot, or an industrial machine, wherein the machine learning device is capable of continuing machine learning so that, even when an inappropriate compensation value is selected, situations where vibration occurs at a moter or a maching point, thereby hindering effective learning, or a machine tool or the like is stopped or shut down due to an alarm, thereby interrupting learning, are prevented, as well as a control device including the machine learning device, and a machine learning method.

(1) A machine learning device according to the present invention is a machine learning device (such as a machine learning device 200 to be described later) configured to perform machine learning related to optimization of a compensation value of a compensation generation unit with respect to a servo control device (such as a servo control device 100, 100A, 100B, or 100C to be described later)

configured to control a servo motor (such as a servo motor 106 to be described later) configured to drive an axis of a machine tool, a robot, or an industrial machine, and that includes at least one feedback loop, a compensation generation unit (such as a position feedforward processing unit 116, a velocity feedforward processing unit 113, or a compensation generation unit 110, 122 to be described later) configured to generate a compensation value to be applied to the feedback loop, and an abnormality detection unit (such as an abnormality detection unit 109, 124 to be described later) configured to detect an abnormal operation of the servo motor, wherein during a machine learning operation, when the abnormality detection unit detects an abnormality, the compensation from the compensation generation unit is stopped and the machine learning device continues optimization of the compensation value generated by the compensation generation unit.

(2) In the machine learning device according to (1), the servo control device may include a switch (such as a switch 105, 114, 126, 128, 130, 132 to be described later) provided between the feedback loop and the inside of the compensation generation unit or a rear stage of the compensation generation unit, and when the abnormality detection unit detects an abnormal operation, the abnormality detection unit may turn off the switch and notify the machine learning device that the compensation to the feedback loop is stopped, and upon receiving the notification that the compensation to the feedback loop is stopped, the machine learning device may apply the compensation value to the learning.

(3) In the machine learning device according to (1) or (2), reinforcement learning may be performed as the machine learning, and when the compensation stop notification is received from the abnormality detection unit, a reward may be offered such that the compensation value with which an abnormal operation occurs would not be selected.

(4) In the machine learning device according to (3), a value function may be updated based on the reward, the optimal compensation value or adjustment information of compensation parameters may be generated based on the updated value function and is output to the compensation generation unit.

(5) In the machine learning device according to any one of (1) to (4), the abnormality detection unit may detect an abnormality when a position error or a torque command or both is equal to or larger than a predetermined threshold.

(6) In the machine learning device according to any one of (1) to (5), the servo control device may further include an informing unit (such as an informing unit 117, 125 to be described later) configured to inform of the detection of the abnormality when an abnormality is detected by the abnormality detection unit.

(7) In the machine learning device according to any one of (2) to (6), the servo control device may include a low-pass filter (such as a low-pass filter 127, 129, 131, or 133 to be described later) provided at a rear stage of the switch, and may pass the compensation value through the low-pass filter upon switching by the switch.

(8) In the machine learning device according to any one of (2) to (6), the feedback loop may include a velocity control unit (such as a velocity control unit 104 to be described later) having an integrator (such as an integrator 1041 to be described later) that integrates a velocity error, and the integrator may be rewritten upon switching by the switch.

(9) In the machine learning device according to any one of (1) to (8), the at least one feedback loop may include at least one of a position feedback loop and a velocity feedback loop, and the compensation generation unit may include at least one of a position feedforward processing unit (such as a position feedforward processing unit 116 to be described later) configured to add a position feedforward term to the position feedback loop and a velocity feedforward processing unit (such as a velocity feedforward processing unit 113 to be described later) configured to add a velocity feedforward term to the velocity feedback loop.

(10) In the machine learning device according to any one of (1) to (8), at least one feedback loop may be a position feedback loop and the compensation generation unit may generate compensation during reversal of the servo motor.

(11) A control device according to the present invention is a control device including: the machine learning device (such as a machine learning device 200 to be described later) according to any one of (1) to (10); and a servo control device (such as a servo control device 100, 100A, 100B, or 100C to be described later) configured to control a servo motor (such as a servo motor 106 to be described later) configured to drive an axis of a machine tool, a robot, or an industrial machine and that includes at least one feedback loop, a compensation generation unit (such as a position feedforward processing unit 116, a velocity feedforward processing unit 113, or a compensation generation unit 110, 122 to be described later) configured to generate compensation to be applied to the feedback loop, and an abnormality detection unit (such as an abnormality detection unit 109, 124 to be described later) configured to detect an abnormal operation of the servo motor.

(12) In the control device according to (11), the machine learning device may be included in the servo control device.

(13) A machine learning method according to the present invention is a machine learning method of a machine learning device (such as a machine learning device 200 to be described later) configured to perform machine learning related to optimization of a compensation value to be applied to at least one feedback loop with respect to a servo control device (such as a servo control device 100, 100A, 100B, or 100C to be described later) configured to control a servo motor (such as a servo motor 106 to be described later) configured to drive an axis of a machine tool, a robot, or an industrial machine, and configured to generate compensation to be applied to the at least one feedback loop and detects an abnormal operation of the servo motor, wherein during a machine learning operation, when the servo control device detects an abnormality, compensation to be applied to the at least one feedback loop is stopped, and the machine learning device continues optimization of the compensation value.

According to the present invention, with respect to a servo control device including at least one feedback loop and a compensation generation unit that generates compensation to be applied to the feedback loop, when the compensation generation unit is machine-learned while actually operating a machine tool, a robot, or an industrial machine, it is possible to continue machine learning such that, even if an inappropriate compensation value is calculated, situations where vibration occurs at a moter or a maching point, thereby hindering effective learning, or a machine tool or the like is stopped or shut down due to an alarm, thereby interrupting the learning, are prevented.

DETAILED DESCRIPTION OF THE INVENTION

Figure 1:
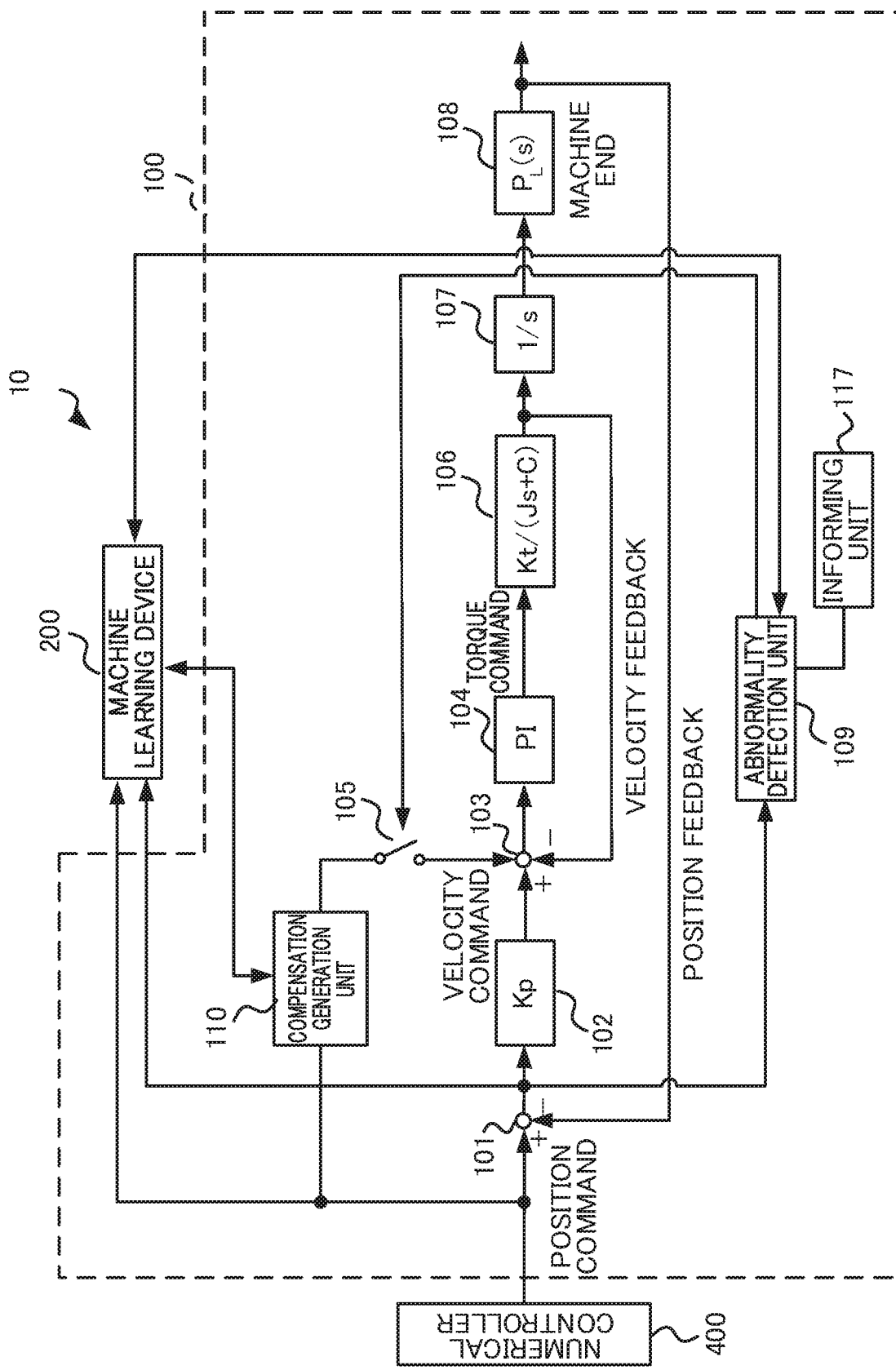
FIG. 1 is a block diagram illustrating a configuration example of a control device according to a first embodiment of the present invention.

Hereinafter, an embodiment of the present invention will be described with reference to the drawings.
(First Embodiment)
FIG. 1 is a block diagram illustrating a configuration example of a control device according to a first embodiment of the present invention. A control device 10 illustrated in FIG. 1 includes a servo control device 100 and a machine learning device 200. The servo control device 100 is connected to a numerical controller (a CNC device) 400.

First, the servo control device 100 will be described. The servo control device 100 includes a subtractor 101, a position control unit 102, an adder/subtractor 103, a velocity control unit 104, a switch 105, a servo motor 106, an integrator 107, a position detection processing unit 108, an abnormality detection unit 109, a compensation generation unit 110, and an informing unit 117.

The numerical controller 400 calculates a position command value based on a program for operating the servo motor 106. In a machine tool, when a table having a workpiece (a work) mounted thereon moves in an X-axis direction and a Y-axis direction, the servo control device 100 illustrated in FIG. 1 is provided in the X-axis direction and the Y-axis direction, respectively. When the table is moved in directions of three or more axes, the servo control device 100 is provided in the respective axial directions. The numerical controller 400 sets a feed rate and calculates a position command so that a machining shape designated by a machining program is obtained and outputs the position command to the subtractor 101, the compensation generation unit 110, and the machine learning device 200. The position command is calculated according to the program that is input as well as commands.

The subtractor 101 receives the position command from the numerical controller 400, calculates a difference between the position command and the detected position that was position-feedbacked, and outputs the difference to the position control unit 102, the abnormality detection unit 109, and the machine learning device 200 as the position error.

The position control unit 102 outputs a value obtained by multiplying the position error output from the subtractor 101 by a position gain Kp to the adder/subtractor 103 as a velocity command.

The adder/subtractor 103 adds the velocity command and a compensation value input from the compensation generation unit 110 via the switch 105, calculates a difference between the added value and a feedback velocity detection value, and outputs the difference to the velocity control unit 104 as a compensated velocity error.

The velocity control unit 104 performs proportional-integral processing (PI processing) on the compensated velocity error and outputs the processed velocity error to the servo motor 106. Specifically, the velocity control unit 104 adds a value which is obtained by integrating the compensated velocity error using an integrator and multiplying said integration value by an integral gain Ki to a value which is obtained by multiplying the compensated velocity error by a proportional gain Kv, and outputs the added value to the servo motor 106 as a torque command to drive the servo motor 106.

The servo motor 106 may be included in a machine tool, a robot, or an industrial machine, for example. The servo control device 100 may be provided as part of a machine tool, a robot, or an industrial machine together with the servo motor 106.

A rotation angle position of the servo motor 106 is detected by a rotary encoder serving as a position detection unit, associated with the servo motor 106, and the velocity detection value is input to the adder/subtractor 103 as a velocity feedback. The components ranging from the adder/subtractor 103 to the servo motor 106 form a velocity feedback loop.

The integrator 107 integrates a velocity detection value to output an integration value to the position detection processing unit 108. The position detection processing unit 108 calculates a position detection value based on the integration value. The position detection value is input to the subtractor 101 as a position feedback. The components ranging from the subtractor 101 to the position detection processing unit 108 form a position feedback loop.

When the position error output from the subtractor 101 is equal to or larger than a threshold, the abnormality detection unit 109 transmits an abnormality detection signal serving as a switching signal to the switch 105 so that the switch 105 is turned off (a non-conducting state). After that, the abnormality detection unit 109 transmits a compensation stop notification signal for notifying the machine learning device 200 of compensation stop. A machining program during learning which is an operation program that is operated to perform machine learning preferably is operated while compensation is stopped and until the program ends. If the operation program is stopped in the middle of operation, since in the next operation, the operation program starts from the position when the machine was stopped, a process for returning the operation program to the starting position may be required depending on the machine. On the other hand, the operation program that operates to perform machine learning operates continuously, an operation of returning to the starting position is basically included. Therefore, the operation program that operates to perform machine learning operates while stopping compensation and returns to the starting position when the program ends, and the machine learning device 200 can continue the next learning. The operation program that is operated to perform machine learning may be stopped in the middle of operation if compensation is stopped, but in this case, as described above, a process for returning the machine to the starting position may be necessary. The compensation stop notification signal may not be provided separately from the abnormality detection signal, and the abnormality detection signal may be used. The machine learning device 200 transmits a compensation value adjustment notification signal to the abnormality detection unit 109 so as to notify that the compensation value of the compensation generation unit 110 is adjusted to a compensation value which is different from the compensation value at the point when an abnormality was detected. Upon receiving the compensation value adjustment notification signal, the abnormality detection unit 109 recognizes that a new compensation value, which is different from the compensation value at the point when the abnormality occurred, was searched and adjusted by the machine learning device 200, and when a new learning operation starts, transmits a switching signal to the switch 105 so that the switch 105 is turned on (conducting state). In this manner, when the abnormality detection unit 109 detects an abnormality to turn off the switch 105, since the compensation value is not output to the adder/subtractor 103, the servo control device 100 operates with the position feedback loop and the velocity feedback loop only and the operation is stable.

The compensation generation unit 110 generates a compensation value for the position feedback loop based on the position error and outputs the compensation value to the adder/subtractor 103 via the switch 105. The compensation value is a position feedforward term based on the position command or a compensation value for suppressing quadrant protrusions, for example. When the switch 105 is turned off by the abnormality detection unit 109, the compensation value generated by the compensation generation unit 110 is not output to the adder/subtractor 103.

The informing unit 117 informs an administrator of an abnormality by displaying information on a liquid crystal monitor, lighting an LED, or outputting sound via a speaker when the abnormality is detected by the abnormality detection unit 109. The informing unit 117 may be a communication unit that transmits information for informing the outside of an abnormality via a network.

Figure 2:
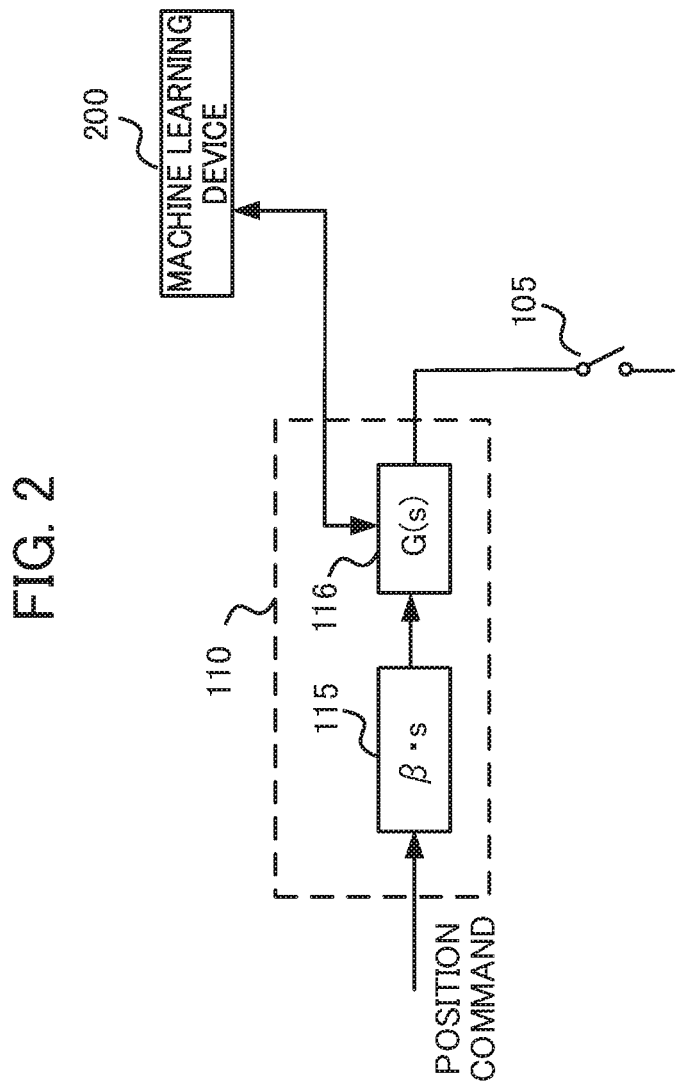
FIG. 2 is a block diagram illustrating a configuration example of a compensation generation unit according to the first embodiment.

FIG. 2 is a block diagram illustrating a configuration example of the compensation generation unit 110 according to the first embodiment. Here, it is assumed that the compensation generation unit 110 includes a position feedforward term generation unit that generates a position feedforward term for a velocity command based on a position command.

As illustrated in FIG. 2, the position feedforward term generation unit includes a differentiator 115 and a position feedforward processing unit 116. The differentiator 115 differentiates the position command and multiplies the result by a constant β. The position feedforward processing unit 116 performs a position feedforward process represented by a transfer function G(s) in Expression 1 (indicated by Math. 1 below) on the output of the differentiator 115. The position feedforward processing unit 116 outputs the processing result to the adder/subtractor 103 via the switch 105 as a position feedforward term (serving as a compensation value). Coefficients $a_i$ and $b_j$ ($m \geq i \geq 0$, $n \geq j \geq 0$; m and n are natural numbers) in Expression 1 are coefficients of the transfer function G(s) of the position feedforward processing unit 116.

$$G(s) = \frac{b_0 + b_1 s + b_s s^2 + \ldots + b_n s^n}{a_0 + a_1 s + a_2 s^2 + \ldots + a_m s^m} \quad \text{[Math. 1]}$$

The machine learning device 200 searches for a compensation value to perform machine learning. In the present embodiment, although reinforcement learning is described as an example of machine learning, machine learning is not particularly limited to reinforcement learning. In reinforcement learning, an agent (corresponding to the machine learning device 200 in the present embodiment) observes the state of the environment and selects a certain action. Then, the environment changes based on the action. A certain reward is given according to the change in the environment, and the agent learns a better selection (decision) of action. In the present embodiment, for example, the position error output from the subtractor 101 is a state of the environment, and an agent selects the compensation value of the compensation generation unit 110 as action information for reducing the position error. In this example, machine learning (reinforcement learning) related to a position feedforward term for generating a compensation value for the velocity command based on the position command illustrated as the compensation generation unit 110 will be described as an example. The machine learning device 200 performs machine learning (hereinafter referred to as learning) on the coefficients $a_i$ and $b_j$ of the transfer function of the position feedforward processing unit 116 by executing a predetermined machining program (the "machining program during learning").

Figure 3:
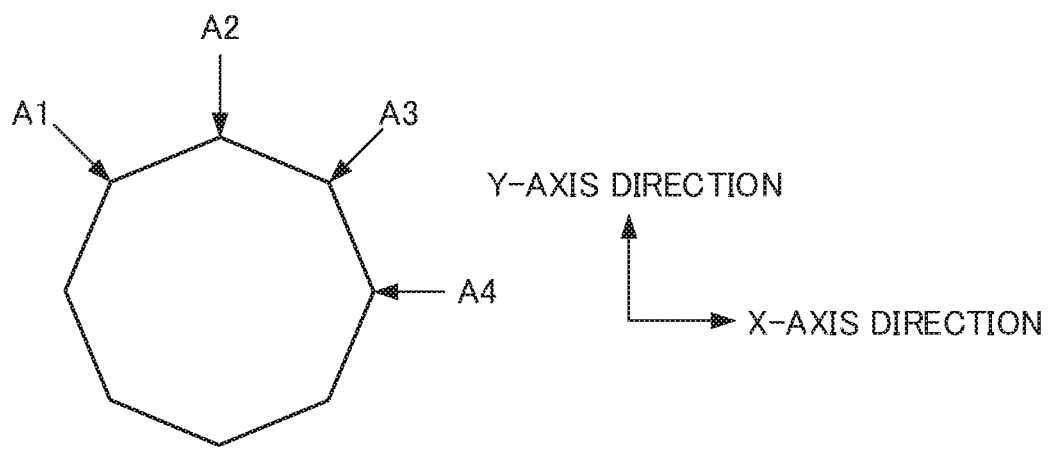
FIG. 3 is a diagram for describing an operation of a motor when the machining shape is an octagon.
Figure 4:
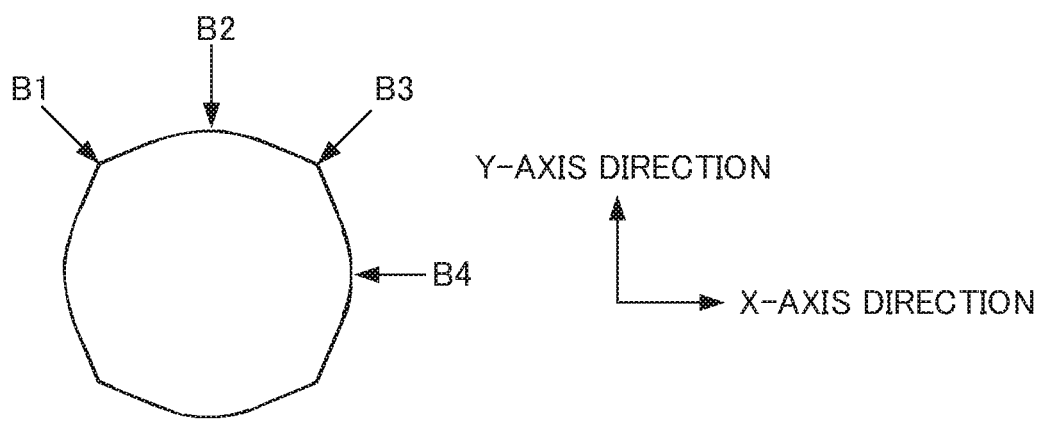
FIG. 4 is a diagram for describing an operation of a motor when a machining shape is a shape in which the corners of an octagon are alternately replaced with arcs.

Here, a machining shape designated by the machining program during learning is an octagon illustrated in FIG. 3 and/or a shape in which the corners of an octagon are alternately replaced with arcs illustrated in FIG. 4, for example. Here, it is assumed that the machine learning device 200 performs learning of the coefficients related to the transfer function G(s) by evaluating the vibration upon change in the rotation speed during linear control at the positions A1 and A3 and/or the positions B1 and B3 of the machining shape designated by the machining program during learning, thereby examining the influence on the position error. The machine learning device 200 may perform learning of the coefficients related to a transfer function for calculating a compensation value for suppressing coasting (so-called "quadrant protrusions") by evaluating quadrant protrusions occurring when the rotating direction is reversed at the positions A2 and A4 and/or the positions B2 and B4 of the machining shape, thereby examining the influence on the position error.

Prior to description of respective functional blocks included in the machine learning device 200, first, a basic mechanism of reinforcement learning will be described. As described above, an agent (corresponding to the machine learning device 200 in the present embodiment) observes the state of the environment and selects a certain action. Then, the environment changes based on the action. A certain reward is given according to the change in the environment, and the agent learns a better selection (decision) of action. While supervised learning presents a complete correct answer, the reward in the reinforcement learning often presents fragmental values based on change in a portion of the environment. Therefore, the agent learns to select an action so that the total reward in the future is maximized.

In this way, in reinforcement learning, by learning n action, a suitable action based on mutual effects of an action on the environment, that is, an action for maximizing the reward to be obtained in the future, is learned. This represents that, in the present embodiment, an action that affects the future, such as an action of selecting action information for reducing a position error, is obtained.

Here, although any learning method may be used as the reinforcement learning, in the description below, Q-learning which is a method of learning a value function $Q(S,A)$ of selecting an action A under a certain state S of the environment will be described as an example. An object of the Q-learning is to select an action A having the highest value function $Q(S,A)$ as an optimal action among actions A that can be taken in a certain state S.

However, at an initial time at which the Q-learning starts, the correct value of the value $Q(S,A)$ is not known at all for a combination of the state S and the action A. Therefore, the agent learns the correct value $Q(S,A)$ by selecting various actions A under a certain state S and making a better selection of action based on rewards given for the selected actions A.

Since the agent wants to maximize the total reward obtained over the course of the future, the Q-learning aims to attain a relation of $Q(S,A)=E[\Sigma(\gamma^t)r_t]$ in the end. Here, $E[\,]$ indicates an expected value, t indicates time, $\gamma$ is a parameter called a discount factor to be described later, $r_t$ is a reward at time t, and $\Sigma$ is the sum at time t. In this expression, the expected value is an expected value when the state was changed according to an optimal action. However, since it is unclear which action would be optimal in the process of Q-learning, reinforcement learning is performed while searching for an optimal action by performing various actions. An updating expression of such a value $Q(S,A)$ can be represented by Expression 2 below (Math. 2).

$$Q(S_{t+1}, A_{t+1}) \leftarrow Q(S_t, A_t) + \alpha\left(r_{t+1} + \gamma\max_A Q(S_{t+1}, A) - Q(S_t, A_t)\right)$$

[Math. 2]

In Expression 2, $S_t$ indicates a state of the environment at time t, and $A_t$ indicates an action at time t. By the action $A_t$, the state changes to $S_{t+1}$. $r_{t+1}$ indicates a reward obtained by the change in the state. Moreover, a term with max is a multiplication of the Q value by $\gamma$ when an action A having the highest Q value known at that moment is selected under the state $S_{t+1}$. Here, $\gamma$ is a parameter of $0<\gamma\leq 1$ and is called a discount rate. Moreover, $\alpha$ is a learning coefficient and is in the range of $0<\alpha\leq 1$.

Expression 2 indicates a method of updating a value $Q(S_t, A_t)$ of an action $A_t$ in a state $S_t$ based on a reward $r_{t+1}$ that was offered in return when the action $A_t$ was performed. This updating expression indicates that if the value $\max_a Q(S_{t+1}, A)$ of the best action in the next state $S_{t+1}$ associated with an action $A_t$ is larger than the value $Q(S_t, A_t)$ of an action $A_t$ in the state $S_t$, $Q(S_t, A_t)$ is increased, and if otherwise, $Q(S_t, A_t)$ is decreased. That is, the updating expression brings the value of a certain action in a certain state close to the value of the best action in the next state associated with the action. However, although this difference differs depending on the discount rate $\gamma$ and the reward $r_{t+1}$, the value of the best action in a certain state basically propagates to the value of an action in a state previous to that state.

Here, a Q-learning method of creating a value function $Q(S,A)$ table for all state-action pairs (S, A) to perform learning is known. However, it may take a considerably long time for the Q-learning to converge, since the number of states is too large to calculate the $Q(S,A)$ values of all state-action pairs.

Thus, Q-learning may use an existing technique called a deep Q-network (DQN). Specifically, with DQN, the value of the value $Q(S,A)$ is calculated by constructing a value function Q using an appropriate neural network and approximating the value function Q with the appropriate neural network by adjusting the parameters of the neural network. By using DQN, it is possible to shorten the time required for convergence of Q-learning. The details of DQN are disclosed in the Non-Patent Document below, for example.

<Non-Patent Document>

"Human-level control through deep reinforcement learning", Volodymyr Mnihl [online], [searched on Jan. 17, 2017], Internet <URL: http://files.davidqiu.com/research/nature14236.pdf>

The machine learning device 200 performs the above-described Q-learning. Specifically, the machine learning device 200 learns a value Q of selecting an action A of adjusting the values of the coefficients $a_i$ and $b_j$ of the transfer function of the position feedforward processing unit 116 associated with a state S, where in the state S is a servo state such as commands and feedbacks including the values of the coefficients $a_i$ and $b_j$ ($m\geq i\geq 0$, $n\geq j\geq 0$; n and m are natural numbers) of the transfer function of the position feedforward processing unit 116 of the servo control device 100 as well as the position error information and the position commands of the servo control device 100 acquired by executing the machining program during learning.

The machine learning device 200 observes the state information S including the servo state such as commands and feedbacks including the position commands and the position error information of the servo control device 100 at the positions A1 and A3 and/or the positions B1 and B3 of the machining shape by executing the machining program during learning based on the coefficients $a_i$ and $b_j$ of the transfer function of the position feedforward processing unit 116 to determine the action A. The machine learning device 200 receives a reward whenever the action A is executed. The machine learning device 200 searches in trial-and-error manner for the optimal action A so that the total of the reward over the course of the future is maximized. By doing so, the machine learning device 200 can select an optimal action A (that is, the optimal coefficients $a_i$ and $b_j$ of the position feedforward processing unit 116) with respect to the state S including the servo state such as commands and feedbacks including the position commands and the position error information of the servo control device 100 acquired by executing the machining program during learning based on the coefficients $a_i$ and $b_j$ of the transfer function of the position feedforward processing unit 116. The machine learning device 200 can learn the coefficients $a_i$ and $b_j$ of the transfer function of the position feedforward processing unit 116 during linear operation.

That is, the machine learning device 200 can select an action A, that is, the coefficients $a_i$ and $b_j$ of the position feedforward processing unit 116, that minimizes the position error acquired by executing the machining program during learning by selecting such an action A that maximizes the value of the value function Q among the actions A applied to the coefficients $a_i$ and $b_j$ of the transfer function of the position feedforward processing unit 116 related to a certain state S based on the learnt value function Q.

Figure 5:
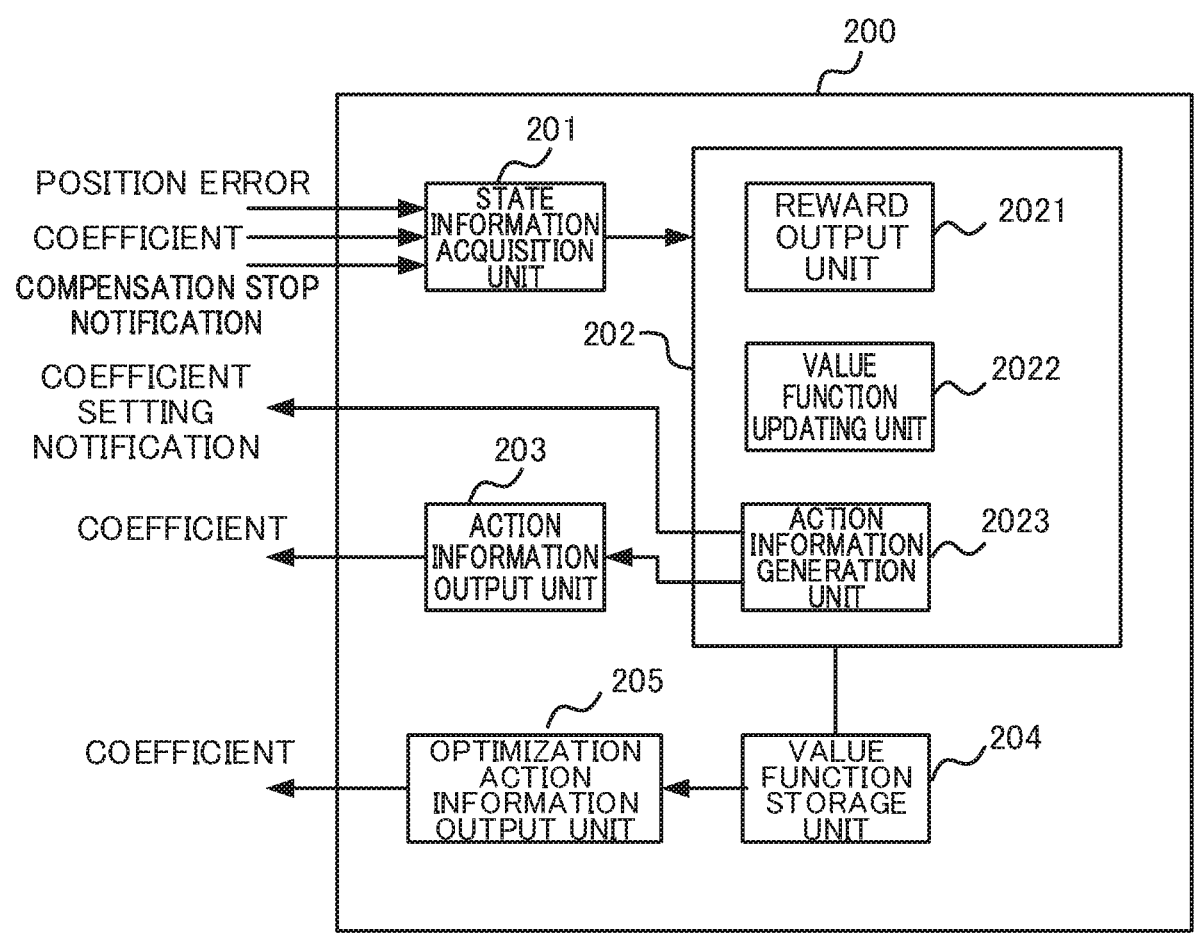
FIG. 5 is a block diagram illustrating a machine learning device according to the first embodiment of the present invention.

FIG. 5 is a block diagram illustrating the machine learning device 200 according to the first embodiment. As illustrated in FIG. 5, in order to perform the reinforcement learning described above, the machine learning device 200 includes a state information acquisition unit 201, a learning unit 202, an action information output unit 203, a value function storage unit 204, and an optimization action information output unit 205. The learning unit 202 includes a reward output unit 2021, a value function updating unit 2022, and an action information generation unit 2023.

The state information acquisition unit 201 acquires, from the servo control device 100, the state S including a servo state such as commands and feedbacks including the position commands and the position error information of the servo control device 100 acquired by executing the machining program during learning based on the coefficients $a_i$ and $b_j$ of the transfer function of the position feedforward processing unit 116 of the servo control device 100. Moreover, the state information acquisition unit 201 acquires a compensation stop notification signal to notify of compensation stop from the abnormality detection unit 109. The state information S corresponds to a state S of the environment in the Q-learning. The state information acquisition unit 201 outputs the acquired state information S to the learning unit 202.

The coefficients $a_1$ and $b_j$ of the position feedforward processing unit 116 at a time point at which the Q-learning starts initially are generated by a user in advance. In the present embodiment, the machine learning device 200 adjusts the initial values of the coefficients $a_i$ and $b_j$ of the position feedforward processing unit 116 created by the user to optimal values by the reinforcement learning. The coefficient β of the differentiator 115 is set to a fixed value, such as β=1, for example. The initial values of the coefficients $a_i$, and $b_j$ of the position feedforward processing unit 116 are set such that, for example, in Expression 1, $a_0$=1, $a_1$=0, $a_2$=0, . . . , and $a_m$=0, $b_0$=1, $b_1$=0, $b_2$=0, . . . , and $b_n$=0. The dimensions m and n of the coefficients $a_i$ and $b_j$ are set in advance. That is, $0 \le i \le m$ for $a_i$, and $0 \le j \le n$ for $b_j$. When a machine tool is adjusted by an operator in advance, the adjusted values may be used as the initial values of the coefficients $a_i$ and $b_j$.

The learning unit 202 is a unit that learns the value Q(S,A) when a certain action A is selected under a certain state S of the environment. Upon receiving the compensation stop notification signal from the abnormality detection unit 109, the learning unit 202 can apply the coefficients $a_i$ and $b_j$ of the position feedforward processing unit 116 in the state S to the learning as compensation parameters with which the servo motor 106 operates abnormally. In this case, as described above, the machining program for learning the state S is operated while compensation is stopped and until the machining program ends. In this case, the machining program operates in the position feedback loop and the velocity feedback loop only. After that, the learning unit 202 searches for new coefficients for the next learning which are different from the coefficients $a_i$ and $b_j$ of the position feedforward processing unit 116 at the point when the abnormality occurred, sets the coefficients to the position feedforward processing unit 116, and transmits a coefficient setting notification signal indicating that the coefficients of the position feedforward processing unit 116 are set to the abnormality detection unit 109.

The reward output unit 2021 is a unit that calculates a reward when the action A is selected under a certain state S. Here, a set (a position error set) of position errors which are state variables of the state S will be denoted by PD(S), and a position error set which is state variables related to state information S' which is changed from the state S due to the action information A will be denoted by PD(S'). Moreover, the evaluation function value of the position error in the state S is a value calculated based on a predetermined evaluation function f(PD(S)). The action information A is the correction of the coefficients $a_i$ and $b_j$ (i and j are 0 or positive integers) of the position feedforward processing unit 116. Here, a set of position errors which are state variables of the state S means a set of position errors measured within a predetermined range including the positions A1 and A3 and/or the positions B1 and B3 of the machining shape. Functions can be used as the evaluation function f includes:

A function that calculates an integrated value of an absolute value of a position error
$\int |e| dt$ A function that calculates an integrated value by a weighting an absolute value of a position error with time
$\int t|e| dt$ A function that calculates an integrated value of a 2n-th power (n is a natural number) of an absolute value of a position error
$\int e^{2n} dt$ (n is a natural number)

A function that calculates a maximum value of an absolute value of a position error
Max{|e|}
wherein e is a position error.

In this case, the reward output unit 2021 sets the value of a reward to a negative value when the evaluation function value f(PD(S')) of the position error of the servo control device 100 operated based on the position feedforward processing unit 116 after the correction related to the state information S' corrected by the action information A is larger than the evaluation function value f(PD(S)) of the position error of the servo control device 100 operated based on the position feedforward processing unit 116 before correction related to the state information S before being corrected by the action information A. When the compensation stop notification signal from the abnormality detection unit 109 is received, the reward output unit 2021 can set the value of the reward to a negative value having a large absolute value so that the coefficients $a_i$ and $b_j$ of the position feedforward processing unit 116 at the point when the abnormality was detected would not be selected. By doing so, the coefficients $a_i$ and $b_j$ of the position feedforward processing unit 116 at the point when an abnormality was detected can be substantially excluded from the future learning range.

On the other hand, when the evaluation function value f(PD(S')) of the position error becomes smaller than the evaluation function value f(PD(S)) of the position error, the reward output unit 2021 sets the value of the reward to a positive value. When the evaluation function value f(PD(S')) of the position error is equal to the evaluation function value f(PD(S)) of the position error, the reward output unit 2021 may set the value of the reward to zero.

Furthermore, if the evaluation function value f(PD(S')) of the position error in the state S' after execution of the action A becomes larger than the evaluation function value f(PD(S)) of the position error in the previous state S, the negative value may be increased according to the proportion.

That is, the negative value may be increased according to the degree of increase in the position error value. In contrast, if the evaluation function value f(PD(S')) of the position error in the state S' after execution of the action A becomes smaller than the evaluation function value f(PD(S)) of the position error in the previous state S, the positive value may be increased according to the proportion. That is, the positive value may be increased according to the degree of decrease in the position error value.

The value function updating unit 2022 updates the value function Q stored in the value function storage unit 204 by performing Q-learning based on the state S, the action A, the state S' when the action A was applied to the state S, and the value of the reward calculated in the abovementioned manner. The updating of the value function Q may be performed by online learning, batch learning, or mini-batch learning. Online learning is a learning method of applying a certain action A to a present state S and updating the value function Q immediately whenever the present state S transitions to a new state S'. Batch learning is a learning method where, by applying a certain action A to a present state S and by repeating the state S transitioning to a new state S', collecting learning data, the value function Q is updated using all the collected learning data. Mini-batch learning is a learning method which is an intermediate between online learning and batch learning and involves updating the value function Q whenever a certain amount of learning data is collected.

The action information generation unit 3023 selects the action A in the process of Q-learning with respect to the present state S. The action information generation unit 2023 generates action information A and outputs the generated action information A to the action information output unit 203 in order to perform an operation (corresponding to the action A of Q-learning) of correcting the coefficients $a_i$ and $b_j$ of the position feedforward processing unit 116 of the servo control device 100 in the process of Q-learning. More specifically, the action information generation unit 2023 adds or subtracts the coefficients $a_i$ and $b_j$ of the position feedforward processing unit 116 included in the action A incrementally (for example, with a step of approximately 0.01) with respect to the coefficients $a_i$ and $b_j$ of the position feedforward processing unit 116 included in the state, for example.

When the coefficients $a_i$ and $b_j$ of the position feedforward processing unit 116 are increased or decreased, the state S transitions to the state S', and a plus reward (a positive reward) is offered in return, the action information generation unit 2023 may select a policy where an action A' that leads to the value of the position error becoming further decreased, such as by incrementally increasing or decreasing the coefficients $a_i$ and $b_j$ of the position feedforward processing unit 116 like the previous action, is selected as the next action A'.

In contrast, when a minus reward (a negative reward) is offered in return, the action information generation unit 2023 may select a policy where an action A' that leads to the position error becoming smaller than the previous value, such as by incrementally decreasing or increasing the coefficients $a_i$ and $b_j$ of the position feedforward processing unit 116 contrarily to the previous action, is selected as the next action A'.

The action information generation unit 2023 may select a policy where the action A' is selected according to a known method such as a greedy method where an action A' having the highest value function Q(S,A) among the values of presently estimated actions A is selected or an c-greedy method where an action A' with a certain small probability E is randomly selected and an action A' having the highest value function Q(S,A) is selected in other cases.

The action information output unit 203 is a unit that transmits the action information A output from the learning unit 202 to the servo control device 100. As described above, the servo control device 100 finely corrects the present state S (that is, the presently set coefficients $a_i$ and $b_j$ of the position feedforward processing unit 116) based on the action information to thereby transition to the next state S' (that is, the corrected coefficients $a_i$ and $b_j$ of the position feedforward processing unit 116).

Further, the action information generation unit 2023 transmits to the abnormality detection unit 109 a coefficient setting notification signal to notify that the respective coefficients $a_i$ and $b_j$ of the position feedforward processing unit 116 are adjusted and set to coefficients $a_i$ and $b_j$ which are different from the coefficients $a_i$ and $b_j$ at the point when an abnormality was detected.

The value function storage unit 204 is a storage device that stores the value function Q. The value function Q may be stored as a table (hereinafter referred to as an action value table) for each state S and each action A, for example. The value function Q stored in the value function storage unit 204 is updated by the value function updating unit 2022. Moreover, the value function Q stored in the value function storage unit 204 may be shared with other machine learning devices 200. When the value function Q is shared by a plurality of machine learning devices 200, since reinforcement learning can be performed in distributed manner in the respective machine learning devices 200, it is possible to improve the reinforcement learning efficiency.

The optimization action information output unit 205 generates the action information A (hereinafter referred to as "optimization action information") which causes the position feedforward processing unit 116 to perform an operation of maximizing the value function Q(S,A) based on the value function Q updated by the value function updating unit 2022 performing the Q-learning. More specifically, the optimization action information output unit 205 acquires the value function Q stored in the value function storage unit 204. As described above, the value function Q is updated by the value function updating unit 2022 performing the Q-learning. The optimization action information output unit 205 generates the action information based on the value function Q and outputs the generated action information to the servo control device 100 (the velocity feedforward processing unit 116). The optimization action information includes information that corrects the coefficients $a_i$ and $b_j$ of the position feedforward processing unit 116, like the action information that the action information output unit 203 outputs in the process of Q-learning.

In the servo control device 100, the coefficients $a_i$ and $b_j$ of the position feedforward processing unit 116 are corrected based on the action information. With the above-described operations, the machine learning device 200 can perform learning and optimization of the coefficients $a_i$ and $b_j$ of the position feedforward processing unit 116 and operate so as to reduce the position error value. As described above, by using the machine learning device 200 according to the present invention, it is possible to simplify the adjustment of compensation parameters (the coefficients $a_i$ and $b_j$) of the position feedforward processing unit 116 of the servo control device 100. With the adjustment of the compensation parameters (the coefficients $a_i$ and $b_j$), the position feedforward term of the position feedforward processing unit 116 is adjusted.

Hereinabove, the functional blocks included in the servo control device 100 and the machine learning device 200 have been described. In order to realize these functional blocks, the servo control device 100 and the machine learning device 200 each include an arithmetic processing unit such as a central processing unit (CPU). The servo control device 100 and the machine learning device 200 each further include an auxiliary storage device such as a hard disk drive (HDD) storing various control programs such as application software or an operating system (OS) and a main storage device such as a random access memory (RAM) for storing data temporarily required when the arithmetic processing device executes a program.

In each of the servo control device 100 and the machine learning device 200, the arithmetic processing device reads an application or an OS from the auxiliary storage device, and deploys the read application software and OS in the main storage device to perform arithmetic processing based on the read application software or OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning device 200 involves a large amount of computation associated with the machine learning, it is preferable to mount graphics processing units (GPUs) on a personal computer and to use a technique called GPGPUs (General-Purpose computing on Graphics Processing Units). High-speed arithmetic processing can be realized when the GPU is used for arithmetic processing associated with machine learning. Furthermore, in order to perform faster processing, the machine learning device 200 may construct a computer cluster using a plurality of computers equipped with such GPUs and may perform parallel processing with the plurality of computers included in the computer cluster.

As described above, in the present embodiment, the servo control device 100 includes the abnormality detection unit 109 and the switch 105, the switch 105 is turned off according to the switching notification signal from the abnormality detection unit 109, and the machine learning device 200 recognizes that an abnormality is detected based on the compensation stop notification signal from the abnormality detection unit 109. Upon recognizing that an abnormality is detected, the machine learning device 200 applies the coefficients $a_i$ and $b_j$ of the position feedforward processing unit 116 in the state S to the learning as compensation parameters with which the servo motor 106 operates abnormally. In this case, as described above, the machining program for learning the state S is operated while compensation is stopped and until the machining program ends, and the machine learning device 200 ends the learning operation for the state S. After that, the learning unit 202 searches for new coefficients for the next learning, selects the next action information, sets the coefficients to the position feedforward processing unit 116, and transmits a coefficient setting notification signal indicating that the new coefficients of the position feedforward processing unit 116 are set to the abnormality detection unit 109. By doing so, the machine learning device 200 can start the learning operation based on the next action. As described above, the machine learning device of the present embodiment can, when machine-learning the compensation generation unit 110, continue machine learning such that, even if an inappropriate compensation value is selected during machine learning, situations where vibration occurs at a moter or a maching point, thereby hindering effective learning, or where a machine tool or the like is stopped or shut down due to an alarm, thereby interrupting the learning, are prevented.

Figure 6:
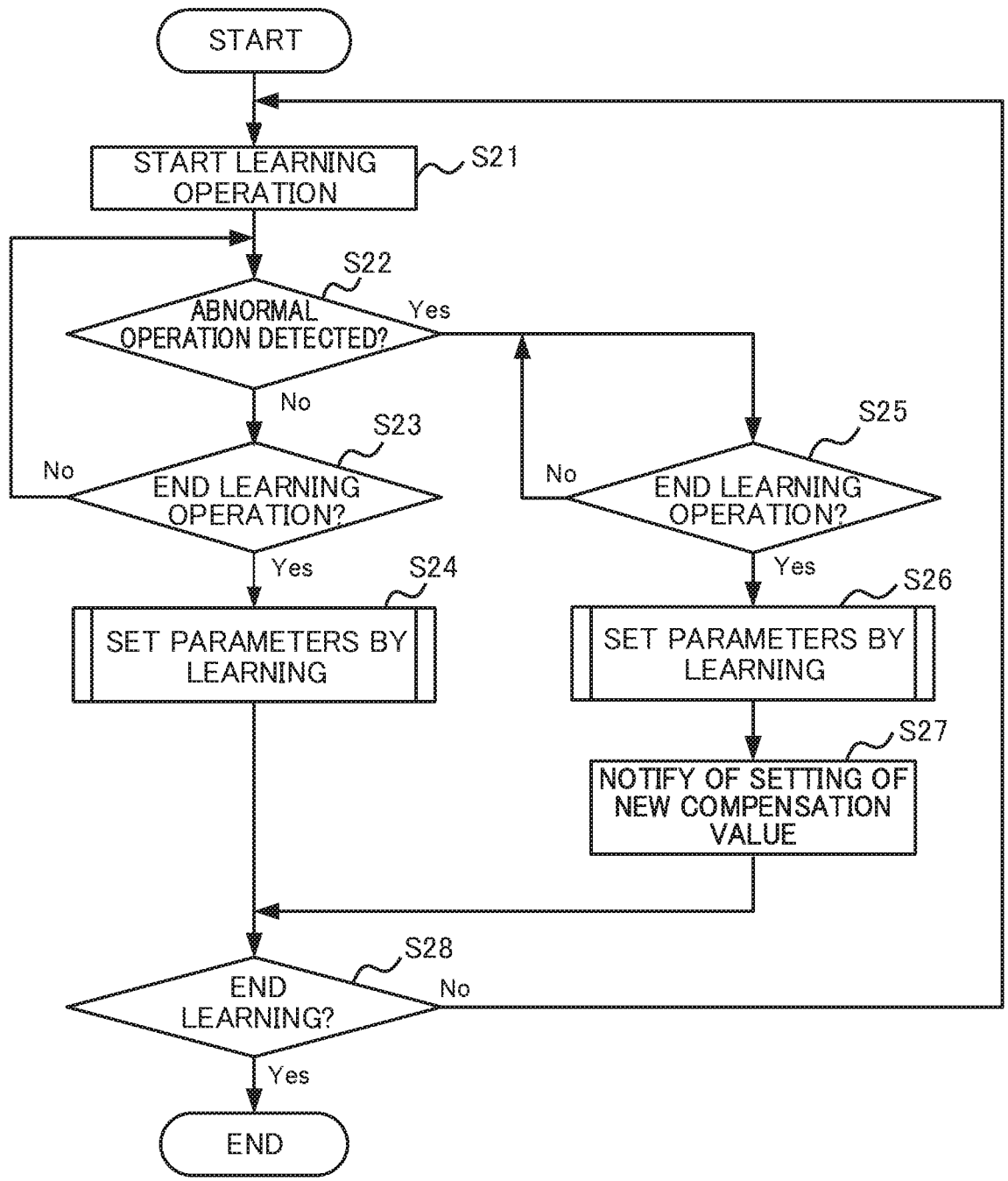
FIG. 6 is a flowchart illustrating an operation of the machine learning device according to the first embodiment.

Next, an operation of the machine learning device 200 of the present embodiment will be described with reference to FIG. 6. As illustrated in FIG. 6, in step S21, the machine learning device 200 starts a learning operation. Here, a learning operation means a series of processes of selecting an action A (the coefficients $a_i$ and $b_j$ of the position feedforward processing unit 116) at the state S, setting the action A to the compensation generation unit 110, executing the machining program during learning to acquire a set of position errors (state variables in the state S') at the aforementioned positions A1 and A3 and/or the positions B1 and B3 of the machining shape, thereby calculating an evaluation function value of the position error and comparing the evaluation function value with the evaluation function value of the position error at the state S to calculate a reward, and updating the value function Q stored in the value function storage unit 204. In the following steps, the machine learning device 200 executes a series of processes. During the learning operation, when the abnormality detection unit 109 detects an abnormality, the machine learning device 200 can apply the action A (the coefficients $a_i$ and $b_j$ of the position feedforward processing unit 116) at the state S to the reward as an action (the compensation parameter) with which the servo motor 106 operates abnormally. In this case, as described above, the machining program during learning of the state S is operated while compensation is stopped and until the machining program ends. This enables the machine learning device to search for the next action and to generate a new action, thereby continuing machine learning such that the learning is not interrupted.

In step S22, the machine learning device 200 determines whether an abnormal operation is detected or not. When it is determined that an abnormal operation is detected (Yes), the flow proceeds to step S25. When an abnormal operation is not detected (No), the flow proceeds to step S23.

In step S23, the machine learning device 200 determines whether the learning operation has ended or not. When the learning operation has ended (Yes), the flow proceeds to step S24. When the learning operation has not ended (No), the flow proceeds to step S22.

In step S24, the machine learning device 200 searches for the next action and set new parameters. Specifically, the machine learning device 200 sets compensation parameters (the coefficients $a_i$ and $b_j$ of the position feedforward processing unit 116) for adjusting the compensation value (the position feedforward term) of the compensation generation unit 110. After that, the flow proceeds to step S28.

In step S25, the machine learning device 200 determines whether the learning operation has ended or not. When the learning operation has ended (Yes), the flow proceeds to step S26. When the learning operation has not ended (No), the flow returns to step S25.

In step S26, the machine learning device 200 learns the compensation value of the compensation generation unit 110 at the point when an abnormality occurred, searches for the next action, and adjusts and sets the compensation value of the compensation generation unit 110 to a compensation value which is different from the compensation value at the point when an abnormality occurred.

In step S27, the machine learning device 200 notifies the abnormality detection unit 109 that a new compensation value is set.

In step S28, the machine learning device 200 determines whether or not to end the machine learning, and the flow returns to step S21 when it is determined that the machine learning is to be continued (No). When the machine learning is to be ended (Yes), the machine learning process ends.

(Modification)

In the first embodiment, the compensation generation unit 110 includes a position feedforward term generation unit that generates a compensation value for a velocity command based on a position command; however, the present invention is not limited thereto. For example, the compensation generation unit 110 may include a velocity feedforward term generation unit to be described later instead of the position feedforward term generation unit. In this case, a velocity feedforward term from the velocity feedforward term generation unit is added via a switch to the output of the velocity control unit 104 that forms a velocity feedback loop. The compensation generation unit 110 may generate a compensation value for quadrant protrusions to be described later. In this case, the compensation value of the quadrant protrusions may be supplied via a switch to the adder/subtractor 103 that forms a velocity feedback loop.

As described above, according to the present embodiment, with respect to a servo control device including at least one feedback loop and a compensation generation unit that generates a compensation to be applied to the feedback loop, when the compensation generation unit is machine-learned while operating a machine tool, a robot, or an industrial machine, the machine learning can be continued such that, even if an inappropriate compensation value is calculated during machine learning, situations where vibration occurs at a moter or a maching point, thereby interrupting effective learning, or where a machine tool or the like is stopped or shut down due to an alarm, thereby interrupting the learning, are prevented.

(Second Embodiment)

In the first embodiment, the compensation generation unit 110 includes the position feedforward term generation unit that generates a compensation value for a velocity command based on a position command. In the second embodiment, in addition to the position feedforward term generation unit that generates a compensation value for a velocity command based on a position command, the compensation generation unit 10 includes a velocity feedforward term generation unit that generates a compensation value for a torque command based on a position command.

Figure 7:
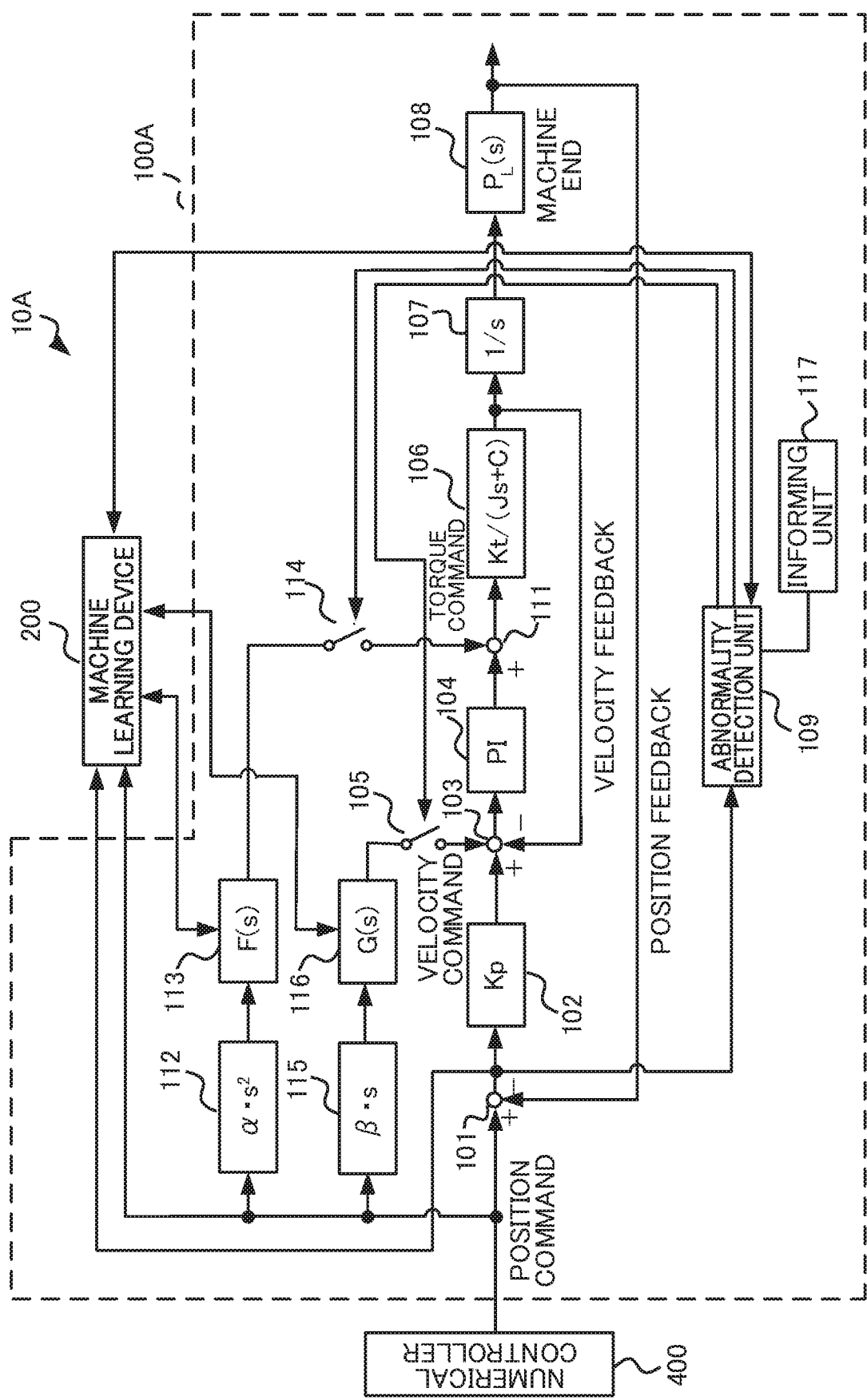
FIG. 7 is a block diagram illustrating a configuration example of a control device according to a second embodiment of the present invention.

FIG. 7 is a block diagram illustrating a configuration example of a control device according to the second embodiment of the present invention. The configuration of the control device 10A of the second embodiment is different from that of the current control device 10 of the first embodiment illustrated in FIG. 1 in that a compensation generation unit 110 (not shown) includes a velocity feedforward term generation unit (not shown) that includes a double differentiator 112 and a velocity feedforward processing unit 113 in addition to the position feedforward term generation unit that includes the differentiator 115 and the position feedforward processing unit 116, as well as in that it includes a switch 114 and an adder 111. Hereinafter, the components which are the same as those of the control device 10A of the second embodiment as those of the control device 10 of the first embodiment illustrated in FIG. 1 will be denoted by the same reference numerals, and the description of the components and the operations thereof will be omitted.

In the second embodiment, the machine learning device 200 performs machine learning (hereinafter referred to as learning) on the coefficients of a transfer function of the position feedforward processing unit 116 as well as the coefficients of a transfer function of the velocity feedforward processing unit 113. In the second embodiment, the machine learning device 200 performs learning of the coefficients of the transfer function of the velocity feedforward processing unit 113 separately from learning of the coefficients of the transfer function of the position feedforward processing unit 116, and performs learning of the coefficients of the transfer function of the velocity feedforward processing unit 113 on an inner side (the inner loop) than the position feedforward processing unit 116 prior to the learning of the coefficients of the transfer function of the position feedforward processing unit 116. Specifically, the machine learning device 200 fixes the coefficients of the transfer function of the position feedforward processing unit 116 and learns the optimal values of the coefficients of the transfer function of the velocity feedforward processing unit 113. After that, the machine learning device 200 fixes the coefficients of the transfer function of the velocity feedforward processing unit 113 to the optimal value obtained by learning and learns the coefficients of the transfer function of the position feedforward processing unit 116. By doing so, the machine learning device 200 can perform learning related to optimization of the coefficients of the transfer function of the position feedforward processing unit 116 under the condition of the velocity feedforward term optimized by learning and can suppress fluctuation of the position error. Therefore, by performing the learning of the coefficients of the transfer function of the velocity feedforward processing unit 113 on an inner side (the inner loop) than the position feedforward processing unit 116 prior to the learning of the coefficients of the transfer function of the position feedforward processing unit 116, it is possible to suppress fluctuation of the position error and realize high acceleration.

<Velocity Feedforward Term Generation Unit>

The position control unit is output to the double differentiator 112. The double differentiator 112 differentiates the position command twice and multiplies the result by a constant α, and the velocity feedforward processing unit 113 performs a velocity feedforward process represented by a transfer function F(s) represented in Expression 3 (indicated by Math. 3 below) on the output of the double differentiator 112, outputting the processing result to the adder 111 via the switch 114 as a velocity feedforward term (serving as a compensation value). When the switch 114 is turned off by the abnormality detection unit 109, the velocity feedforward term is not output to the adder 111. The coefficients $c_i$ and $d_j$ ($m \geq i \geq 0$, $n \geq j \leq 0$; m and n are natural numbers) in Expression 3 are the coefficients of the transfer function F(s) of the velocity feedforward processing unit 113.

$$F(s) = \frac{d_0 + d_1 s + d_2 s^2 + \ldots + d_n s^n}{c_0 + c_1 s + c_2 s^2 + \ldots + c_m s^m} \quad \text{[Math. 3]}$$

The adder 111 adds the torque command output from the velocity control unit 104 and the velocity feedforward term input from the velocity feedforward processing unit 113 via the switch 114, and outputs the added result to the servo motor 106 as a feedforward-controlled torque command to drive the servo motor 106.

When the machine learning device 200 performs the learning of the coefficients of the transfer function of the velocity feedforward processing unit 113 prior to the learning of the coefficients of the transfer function of the position feedforward processing unit 116, the abnormality detection unit 109 transmits an abnormality detection signal serving as switching signal for turning the switch 114 off (non-conducting state) when the position error output from the subtractor 101 becomes equal to or larger than a threshold. The machine learning device 200 transmits a coefficient setting notification signal to the abnormality detection unit 109 to notify that new coefficients, which have values of the coefficients $c_i$ and $d_j$ ($m \le i \le 0 m \ n \ge j \le 0$) of the transfer function of the velocity feedforward processing unit 113 that are different from those at the point when an abnormality was detected, are searched and adjusted like in the first embodiment. Upon receiving the coefficient setting notification signal, the abnormality detection unit 109 recognizes that new coefficients, which are different from the coefficients at the point when an abnormality occurred in the machine learning device 200, are searched and adjusted, thereby transmitting a switching signal to the switch 114 so that the switch 114 is turned on (conducting state) when the coefficient setting notification signal is received or a new learning operation starts.

When the abnormality detection unit 109 detects an abnormality and turns off the switch 114, since the velocity feedforward term is not output to the adder 111, the operation of the servo control device 100 becomes stable.

<Machine Learning Device 200>

Like the first embodiment, the machine learning device 200 performs machine learning (learning) on the coefficients of the transfer function of the velocity feedforward processing unit 113 and the coefficients of the transfer function of the position feedforward processing unit 116 by executing a predetermined machining program (the "machining program during learning"). In the following description, learning of the coefficients of the transfer function of the velocity feedforward processing unit 113 is described, wherein the learning of the coefficients of the transfer function of the position feedforward processing unit 116 described in the first embodiment is performed after learning of the coefficients of the transfer function of the velocity feedforward processing unit 113 is performed.

The machine learning device 200 learns a value Q of selecting as action A the adjusting of the values of the coefficients $c_i$ and $d_j$ of the transfer function of the velocity feedforward processing unit 113 associated with a state S, wherein the state S is a servo state of commands and feedbacks including the values of the coefficients $c_i$ and $d_j$ of the transfer function of the velocity feedforward processing unit 113 of the servo control device 100, as well as the position commands and the position error information of the servo control device 100 acquired by executing the machining program during learning.

The machine learning device 200 observes the state information S including the servo state such as commands and feedbacks including the position commands and the position error information of the servo control device 100 at the aforementioned positions A1 and A3 and/or the positions B1 and B3 of the machining shape by executing the machining program during learning based on the coefficients $c_i$ and $d_j$ of the transfer function of the velocity feedforward processing unit 113, thereby determining the action A. The machine learning device 200 receives a reward whenever the action A is executed. The machine learning device 200 searches in a trial-and-error manner for the optimal action A so that the total reward over the course of the future is maximized. By doing so, the machine learning device 200 can select an optimal action A (that is, the optimal coefficients $c_i$ and $d_j$ of the velocity feedforward processing unit 113) with respect to the state S including the servo state such as commands and feedbacks including the position command and the position error information of the servo control device 100 acquired by executing the machining program during learning based on the coefficients c, and $d_j$ of the transfer function of the velocity feedforward processing unit 113. The rotation direction of the servo motor in the X-axis direction and the Y-axis direction does not change at the positions A1 and A3 and the positions B1 and B3, and hence, the machine learning device 200 can learn the coefficients $c_i$ and $d_j$ of the transfer function of the velocity feedforward processing unit 113 during linear operation.

That is, the machine learning device 200 can select an action A (that is, the coefficients $c_i$ and $d_j$ of the velocity feedforward processing unit 113) that minimizes the position error, which is acquired by executing the machining program during learning, by selecting an action A that maximizes the value of Q from among the actions A applied to the coefficients $c_i$ and $d_j$ of the transfer function of the velocity feedforward calculation unit 110 related to a certain state S based on the learnt value function Q.

Since the processes related to the respective coefficients $c_i$ and $d_j$ of the transfer function of the velocity feedforward processing unit 113 in the state information acquisition unit 201 (including the reward output unit 2021, the value function updating unit 2022, and the action information generation unit 2023), the learning unit 202, the action information output unit 203, the value function storage unit 204, and the optimization action information output unit 205 included in the machine learning device 200 can be described by substituting the position feedforward processing unit 116 of the first embodiment with the velocity feedforward processing unit 113 and by substituting the coefficients $a_i$ and $b_j$ of the position feedforward processing unit 16 with the coefficients $c_i$ and $d_j$ of the transfer function of the velocity feedforward processing unit 113, detailed descriptions thereof will be omitted.

Further, the coefficients $c_i$ and $d_j$ of the velocity feedforward processing unit 113 at a time point at which the Q-learning starts initially are generated by a user in advance. In the present embodiment, the initial values of the coefficients $c_i$ and $d_j$ of the velocity feedforward processing unit 113 created by the user are adjusted to optimal values by the reinforcement learning. The coefficient α of the double differentiator 112 is set to a fixed value, such as α=1, for example. The initial values of the coefficients $c_i$ and $d_j$ of the velocity feedforward processing unit 113 are set such that, for example, in Expression 2, $c_0=1$, $c_1=0$, $c_2=0$, ..., and $c_m=0$, and $d_0=1$, $d_1=0$, $d_2=0$, ..., and $d_n=0$. The dimensions m and n of the coefficients $c_i$ and $d_j$ are set in advance. That is, $0 \le i \le m$ for $c_i$, and $0 \le j \le n$ for $d_j$. Alternatively, the same values as the initial values of the coefficients $a_i$ and $b_j$ of the transfer function of the position feedforward processing unit 116 may be applied to the initial values of the coefficients $c_i$ and $d_j$. Similarly, the processes related to the coefficients $c_i$ and $d_j$ of the velocity feedforward processing unit 113 in the servo control device 100 can be described by substituting the coefficients $a_i$ and $b_j$ of the position feedforward processing unit 116 with the coefficients $c_i$ and $d_j$ of the transfer function of the velocity feedforward processing unit 113.

As described above, in the second embodiment, the servo control device 100 includes the double differentiator 112, the velocity feedforward processing unit 113, and the switch 114, and the switch 114 is turned off according to the signal from the abnormality detection unit 109, and the machine learning device 200 recognizes that an abnormality is detected based on the compensation stop notification signal from the abnormality detection unit 109. Upon recognizing that an abnormality is detected, the machine learning device 200 can apply the coefficients $c_i$ and $d_j$ of the velocity feedforward processing unit 113 in the state S to the learning as compensation parameters with which the servo motor 106 operates abnormally. In this case, as described above, the machining program for learning the state S is operated while compensation is stopped and until the machining program ends, and the machine learning device 200 ends the learning operation for the state S. With the adjustment of the compensation parameters (the coefficients $c_i$ and $d_j$), the velocity feedforward term of the velocity feedforward processing unit 113 is adjusted. After that, the learning unit 200 searches for new coefficients for the next learning, selects the next action information, sets the coefficients to the velocity feedforward processing unit 113, and transmits a coefficient setting notification signal to the abnormality detection unit 109 indicating that the new coefficients of the velocity feedforward processing unit 113 are set. By doing so, the learning operation based on the next action starts. As described above, when the compensation generation unit 110 is machine-learned, the machine learning device of the present embodiment can continue machine learning so that, even when an inappropriate compensation value is selected, situations where vibration occurs at a motor or a maching point, thereby hindering effective learning, or where a machine tool or the like is stopped or shut down due to an alarm, thereby interrupting the learning, are prevented.

Next, the operation of the machine learning device 200 of the second embodiment will be described. Detailed description of the operations related to the coefficients $c_i$ and $d_j$ of the transfer function of the velocity feedforward processing unit 113 of the machine learning device 200 will be omitted since it can be described by substituting the position feedforward processing unit 116 with the velocity feedforward processing unit 113 in the process flow of the machine learning device 200 illustrated in FIG. 6 of the first embodiment as well as substituting the coefficients $a_i$ and $b_j$ of the position feedforward processing unit 116 with the coefficients $c_i$ and $d_j$ of the transfer function of the velocity feedforward processing unit 113.

(Modification)

In the second embodiment, the machine learning device 200 performs learning of the coefficients of the transfer function of the velocity feedforward processing unit 113, and after optimizing the coefficients of the transfer function of the velocity feedforward processing unit 113, performs learning of the coefficients of the transfer function of the position feedforward processing unit 116; however, the second embodiment is not limited thereto. For example, the machine learning device 200 may learn the coefficients of the transfer function of the position feedforward processing unit 116 and the coefficients of the transfer function of the velocity feedforward processing unit 113 simultaneously. In this case, when the abnormality detection unit 109 detects an abnormality, the abnormality detection unit 109 turns on the switches 114 and 105 simultaneously so that the machine learning device 200 can perform learning of the coefficients simultaneously. However, when the machine learning device 200 learns the coefficients simultaneously, the two learning operations may interfere with each other and the amount of information processed may increase.

(Third Embodiment)

In the control device 10 of the first embodiment, as illustrated in FIG. 1, when the abnormality detection unit 109 detected an abnormality, the abnormality detection unit 109 turned off the switch 105, thereby separating the compensation generation unit 110 including the differentiator 115 and the position feedforward processing unit 116 from the position feedback loop. Similarly, in the control device 10A of the second embodiment, as illustrated in FIG. 7, when the abnormality detection unit 109 detects an abnormality, the abnormality detection unit 109 turned off the switch 114, thereby separating the double differentiator 112 and the velocity feedforward processing unit 113 from the velocity feedback loop, while turning off the switch 105, thereby separating the differentiator 115 and the position feedforward processing unit 116 from the position feedback loop.

Figure 8:
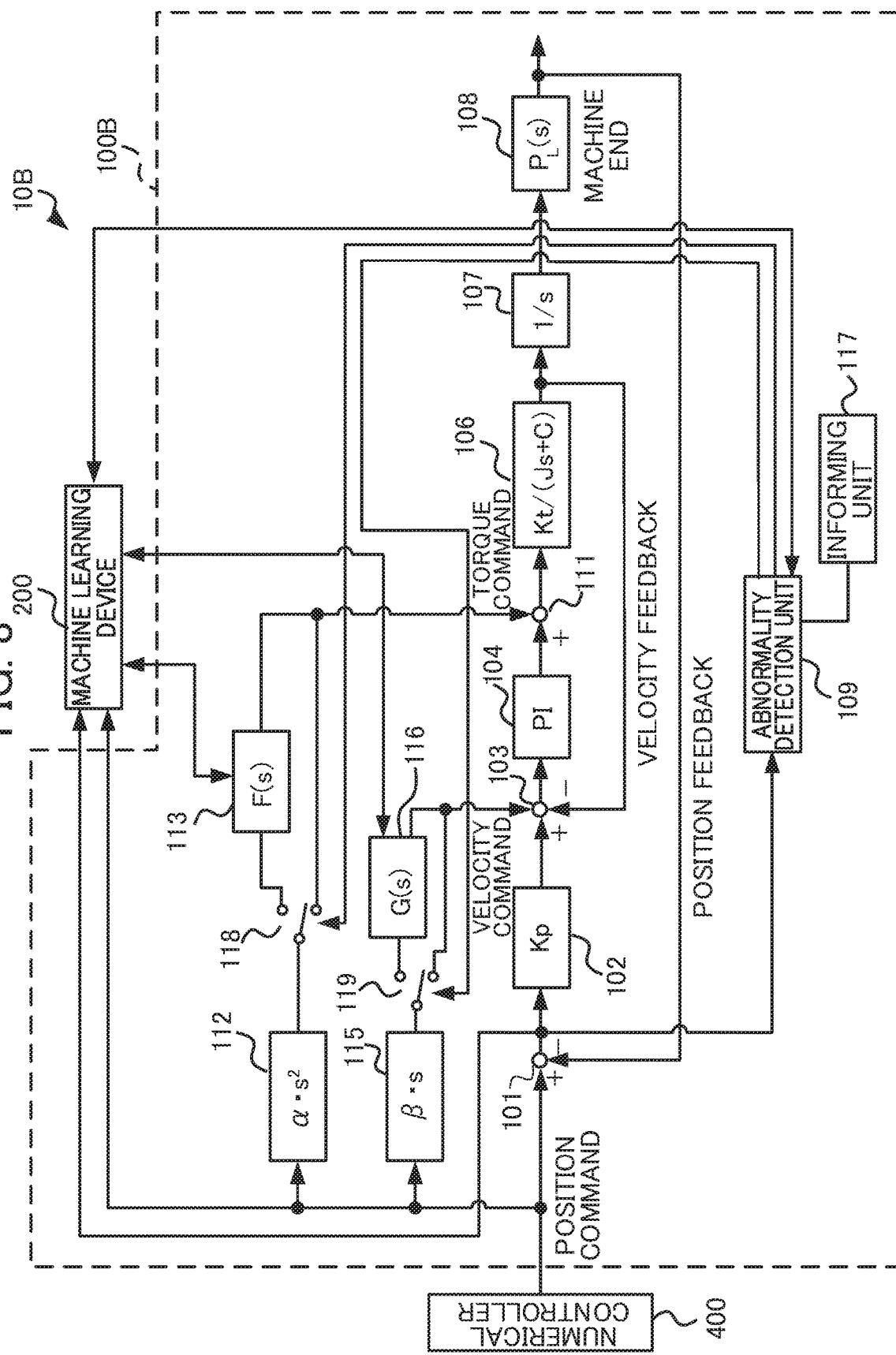
FIG. 8 is a block diagram illustrating a configuration example of a control device according to a third embodiment of the present invention.

In contrast, in a control device of the third embodiment, when the abnormality detection unit 109 detects an abnormality, only the velocity feedforward processing unit 113 and/or the position feedforward processing unit 116 in the compensation generation unit, which is a part where the machine learning device 200 learns, was separated. FIG. 8 is a block diagram illustrating a configuration example of a control device according to the third embodiment of the present invention. The components illustrated in FIG. 8 which are the same as those of the control device illustrated in FIG. 7 will be denoted by the same reference numerals, and the description thereof will be omitted.

In the present embodiment, as illustrated in FIG. 8, a servo control device 100B includes a switch 118 disposed between the double differentiator 112 and the velocity feedforward processing unit 113 instead of the switch 114. Further, the servo control device 100B includes a switch 119 disposed between the differentiator 115 and the position feedforward processing unit 116 instead of the switch 105. The switch 118 switches the double differentiator 112 so that it is connected to the velocity feedforward processing unit 113 or the adder 111. The switch 119 switches the differentiator 115 so that it is connected to the position feedforward processing unit 116 or the adder/subtractor 103.

When an abnormality is detected, the abnormality detection unit 109 switches the switch 118 and/or the switch 119 so that the double differentiator 112 is connected to the adder 111 and the differentiator 115 is connected to the adder/subtractor 103. Due to such a configuration, in the present embodiment, only the velocity feedforward processing unit 113 and/or the position feedforward processing unit 116, which is a part that is learned by the machine learning device 200, is separated. Therefore, when the abnormality detection unit 109 detects an abnormality, the output of the differentiator 115 is added to the position feedback loop so that compensation can be performed, and the output of the double differentiator 112 is added to the velocity feedback loop so that compensation can be performed.

The present embodiment can be applied to any of the first and second embodiments, and when the present embodiment is applied to the first embodiment, the servo control device includes the switch 119 disposed between the differentiator 115 and the position feedforward processing unit 116. When the present embodiment is applied to a case in which the velocity feedforward term generation unit is provided, which is a modification of the first embodiment, the servo control device includes the switch 119 disposed between the double differentiator 112 and the velocity feedforward processing unit 113. When the present embodiment is applied to the second embodiment, the servo control device includes the switch 118 and the switch 119.

(Modification)

In the present embodiment, like the second embodiment, when the machine learning device 200 performs the learning of the coefficients of the transfer function of the velocity feedforward processing unit 113 separately from the learning of the coefficients of the transfer function of the position feedforward processing unit 116, the machine learning device 200 performs learning of the coefficients of the transfer function of the velocity feedforward processing unit 113 prior to the learning of the coefficients of the transfer function of the position feedforward processing unit 116. However, like the modification of the second embodiment, the machine learning device 200 may perform learning of the coefficients of the transfer function of the position feedforward processing unit 116 and the coefficients of the transfer function of the velocity feedforward processing unit 113 simultaneously.

(Fourth Embodiment)

In the embodiment described above, the process when the abnormality detection unit 109 detects an abnormality during the learning operation of the machine learning device 200 related to a linear operation in which the rotation direction of the servo motor in the X-axis direction and the Y-axis direction does not change has been described. However, the present invention is not limited to a learning operation during linear operation, and can also be applied to a learning operation during a nonlinear operation. For example, as described previously, it is known that when a machine tool performs a circular motion with a feed driving system driven by a motor and a ball screw as a non-linear operation, protrusion-shaped trajectory errors (hereinafter referred to as "quadrant protrusions") occur during quadrant switching where a moving direction of an axis is reversed.

Figure 9:
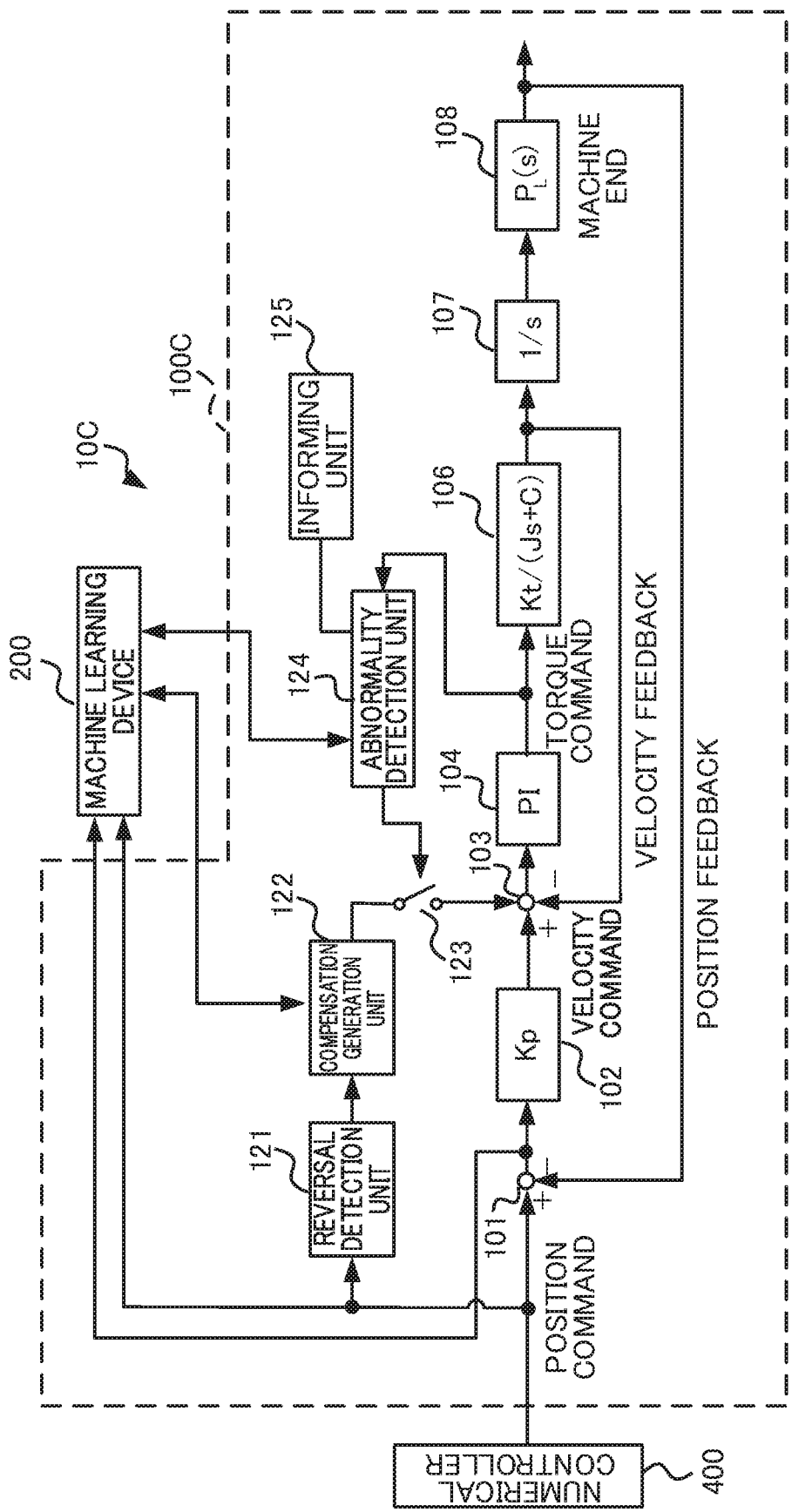
FIG. 9 is a block diagram illustrating a configuration example of a control device according to a fourth embodiment of the present invention.

In the fourth embodiment, an example in which the machine learning device 200 performs learning of a compensation value of quadrant protrusions will be described. FIG. 9 is a block diagram illustrating a configuration example of a control device of the fourth embodiment of the present invention. In a control device 10C illustrated in FIG. 9, the components which are the same as those of the control device illustrated in FIG. 7 are denoted by the same reference numerals, and the description thereof will be omitted. As illustrated in FIG. 9, a servo control device 100C includes a reversal detection unit 121, a compensation generation unit 122, a switch 123, an abnormality detection unit 124, and an informing unit 125. The servo control device 100C does not include the abnormality detection unit 109, the double differentiator 112, the velocity feedforward processing unit 113, the switch 114, the differentiator 115, the position feedforward processing unit 116, the switch 105, and the informing unit 117 illustrated in FIG. 7.

The numerical controller 400 calculates a position command for a machining shape, such as that illustrated in FIG. 4 in which the corners of an octagon are alternately replaced with arcs, based on a machining program during learning. The position command is input to the subtractor 101, the reversal detection unit 121, and the machine learning device 200. The subtractor 101 calculates a difference between the position command and the detected position that was position-feedbacked, and outputs the difference to the position control unit 102 and the machine learning device 200 as the position error.

The reversal detection unit 121 detects a reversal portion from the position command. For example, the rotating direction of a motor that moves a table in the Y-axis direction at the position B2 of the arc illustrated in FIG. 4 is reversed, and the reversal detection unit 121 detects the reversal at the position B2 based on the position command. The compensation generation unit 122 outputs a compensation value to the adder/subtractor 103 via the switch 123 based on the reversal detection signal.

The abnormality detection unit 124, based on the torque command output from the velocity control unit 104, transmits, when the torque command is equal to or larger than a threshold, a switching signal so that the switch 123 is turned off (non-conducting state) to stop compensation of the position feedback loop. After that, the abnormality detection unit 124 transmits a compensation stop signal to the machine learning device 200, while, with regards to the operation of the machining program during learning, the operation is continued until the machining program ends while compensation is stopped, as described above. After that, the machine learning device 200 transmits a compensation value adjustment notification signal to notify that the compensation value of the compensation generation unit 122 is searched and adjusted to a compensation value which is different from the compensation value at the point when an abnormality was detected. Upon receiving the compensation value adjustment notification signal, the abnormality detection unit 124 recognizes that the compensation value at the point when an abnormality occurred in the machine learning device 200 is adjusted to a new compensation value, and transmits a switching signal to the switch 123 so that the switch 123 is turned on (conducting state) when a new learning operation starts.

When the abnormality is detected by the abnormality detection unit 124, the informing unit 125 informs the administrator of an abnormality by displaying information on a liquid crystal monitor, lighting an LED, or outputting sound via a speaker. The informing unit 125 may also be a communication unit that transmits information for informing the outside of an abnormality via a network.

In order to compensate the quadrant protrusions, the machine learning device 200 performs learning using the position error which is the output of the subtractor 101 at the positions B2 and B4 of the machining shape illustrated in FIG. 4, and adjusts the compensation value of the compensation generation unit 122. When the abnormality detection unit 124 detects an abnormality and turns off the switch 123, since the compensation value is not output to the adder/subtractor 103, the servo control device 100C operates with the position feedback loop and the velocity feedback loop and the operation thereof becomes stable.

When quadrant protrusions are compensated, a machining program during learning for the octagonal machining shape illustrated in FIG. 3 may be used. In this case, for example, the rotating direction of a motor that moves a table in the Y-axis direction at the position A2 illustrated in FIG. 3 is reversed, and the rotating direction of a motor that moves the table in the X-axis direction is reversed at the position A4. The machine learning device 200 performs learning using the position error which is the output of the subtractor 101 at the positions A2 and A4 of the octagonal machining shape illustrated in FIG. 3, for example, and adjusts the compensation value of the compensation generation unit 122 in order to compensate quadrant protrusions.

(Fifth Embodiment)

In the control device of the first and second embodiments, when the abnormality detection unit 109 switches the switch 114 and/or 105 from on to off, the position feedforward term and/or the velocity feedforward term (the compensation value) applied to the position feedback loop and the velocity feedback loop, respectively, changes discontinuously during the switching. Further, in the control device of the third embodiment, when the abnormality detection unit 109 switches the switch 118 and/or 119, the position feedforward term and/or the velocity feedforward term (the compensation value) applied to the position feedback loop and the velocity feedback loop, respectively, changes discontinuously during the switching. Further, in the control device of the fourth embodiment, when the abnormality detection unit 124 switches the switch 123, the compensation value changes discontinuously during the switching.

The discontinuous compensation value generated in the first to fourth embodiments causes a discontinuous velocity command and/or a discontinuous torque command. In the present embodiment, a low-pass filter is provided to prevent discontinuity of the compensation value. Hereinafter, a case in which the configuration of the present embodiment is applied to the first to fourth embodiments will be described.

Figure 10:
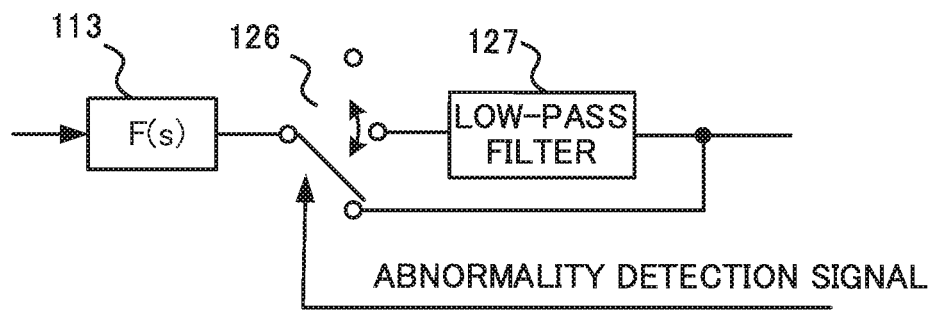
FIG. 10 is a block diagram illustrating a portion of a rear-stage configuration of a velocity feedforward processing unit of a servo control device according to a fifth embodiment of the present invention.
Figure 11:
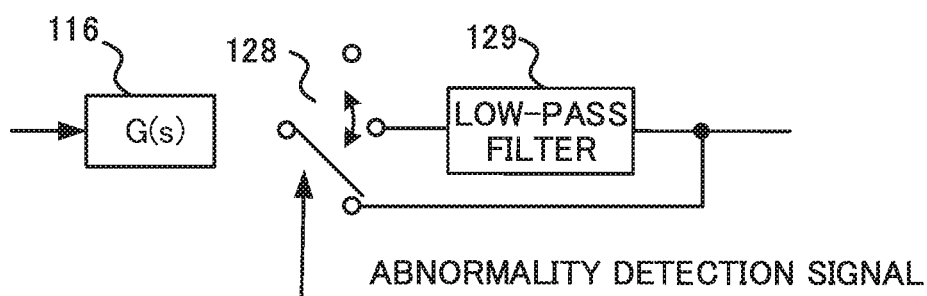
FIG. 11 is a block diagram illustrating a portion of a rear-stage configuration of a position feedforward processing unit of a servo control device according to the fifth embodiment of the present invention.

When the configuration of the present embodiment is applied to the control device of the first and second embodiments, a low-pass filter is provided at the rear stage of the velocity feedforward processing unit 113 and/or the position feedforward processing unit 116, respectively, in order to prevent discontinuity of the compensation value. By passing the compensation value through the low-pass filter, it becomes possible to slowly follow up the discontinuous values. FIG. 10 is a block diagram illustrating a portion of a rear-stage configuration of the velocity feedforward processing unit 113 of a servo control device according to the fifth embodiment of the present invention. FIG. 11 is a block diagram illustrating a portion of a rear-stage configuration of the position feedforward processing unit 116 of a servo control device according to the fifth embodiment of the present invention.

As illustrated in FIG. 10, a switch 126 is connected to the velocity feedforward processing unit 113 instead of the switch 114. Upon receiving an abnormality detection signal from the abnormality detection unit 109, the switch 126 switches from a state in which the velocity feedforward processing unit 113 is connected directly to the adder 111 to a state in which the velocity feedforward processing unit 113 is connected to the adder 111 via a low-pass filter 127, maintains the state for a predetermined period, and then switches to a non-connected state. The predetermined period can be determined based on the time period that allows the compensation value to converge sufficiently or the time constant of the low-pass filter 127.

Figure 12:
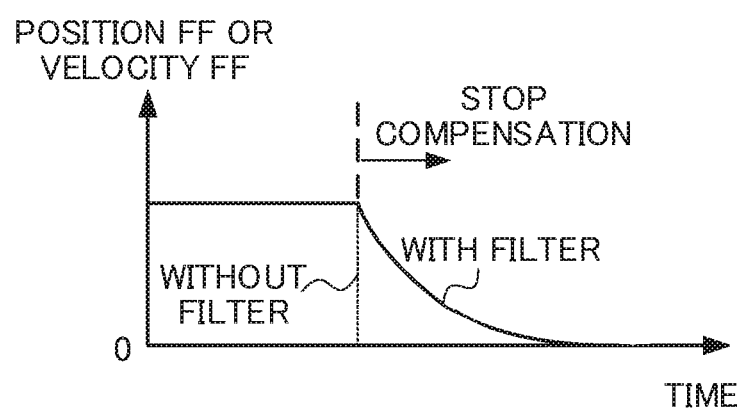
FIG. 12 is a characteristic diagram illustrating the change in compensation value by a position feedforward (position FF) process or a velocity feedforward (velocity FF) process depending on the presence of a filter.

Further, as illustrated in FIG. 11, a switch 128 is connected to the position feedforward processing unit 116 instead of the switch 105. Upon receiving an abnormality detection signal from the abnormality detection unit 109, the switch 128 switches from a state in which the position feedforward processing unit 116 is connected directly to the adder/subtractor 103 to a state in which the position feedforward processing unit 116 is connected to the adder/subtractor 103 via a low-pass filter 129, maintains the state for a predetermined period, and then switches to a non-connected state. The predetermined period can be determined based on the time period that allows the compensation value to converge sufficiently or the time constant of the low-pass filter 129. In this manner, the switch, rather than discontinuously switching the connection between the velocity feedforward processing unit 113 and the adder 111, temporarily switches to a connected state via the low-pass filter 127, allowing for slow convergence. Moreover, the switch, rather than discontinuously switching the connection between the position feedforward processing unit 116 and the adder/subtractor 103, temporarily switches to a connected state via the low-pass filter 129, allowing for slow convergence. FIG. 12 is a characteristic diagram illustrating the change in compensation value by a position feedforward (position FF) process or a velocity feedforward (velocity FF) process depending on the presence of a filter.

Figure 13:
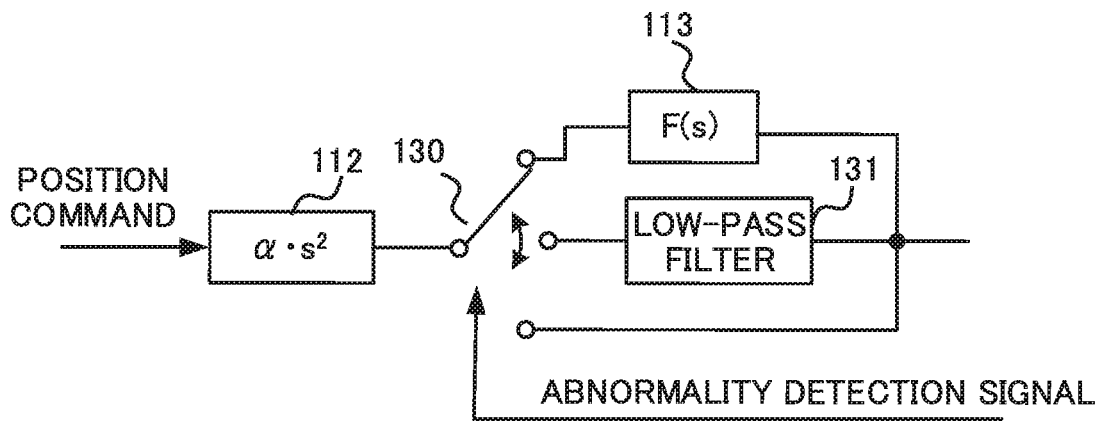
FIG. 13 is a block diagram illustrating a portion of a rear-stage configuration of a double differentiator of a servo control device having another configuration according to the fifth embodiment of the present invention.
Figure 14:
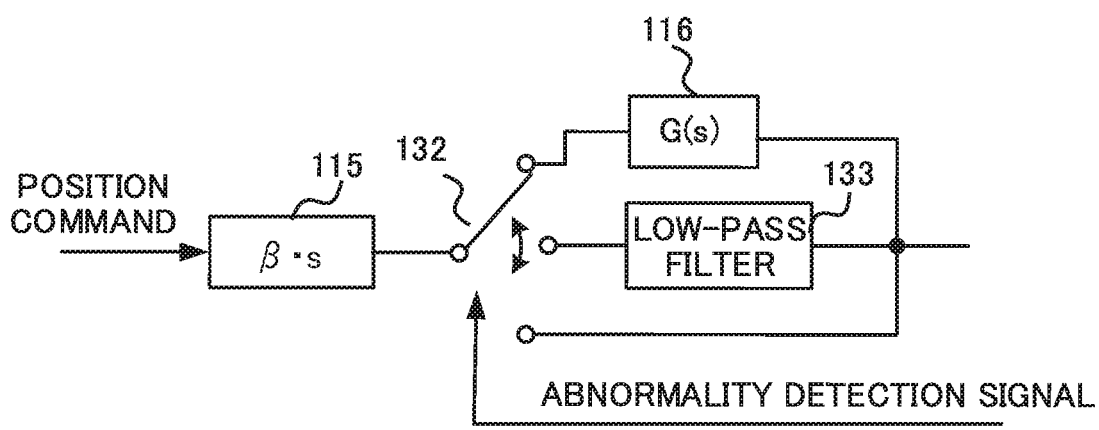
FIG. 14 is a block diagram illustrating a portion of a rear-stage configuration of a differentiator of a servo control device having another configuration according to the fifth embodiment of the present invention.
Figure 15:
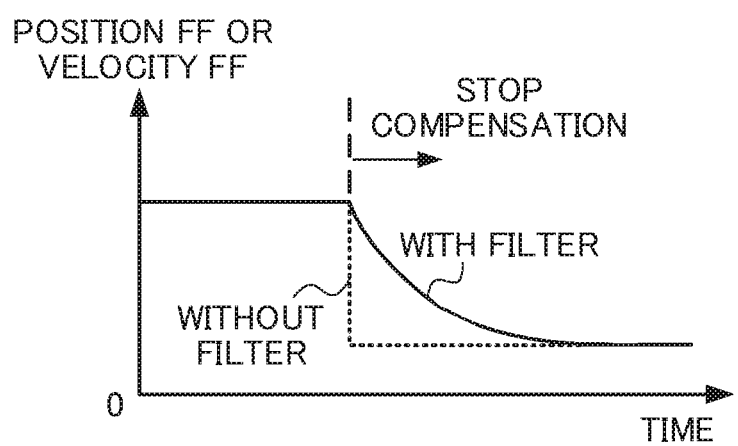
FIG. 15 is a characteristic diagram illustrating the change in compensation value by a position feedforward (position FF) process or a velocity feedforward (velocity FF) process depending on the presence of a filter in the servo control device having another configuration.

When the configuration of the present embodiment is applied to the control device of the third embodiment, a low-pass filter is provided at the rear stages of the double differentiator 112 and the differentiator 115, respectively, in order to prevent discontinuity of the compensation value. By passing the compensation value through the low-pass filter, it becomes possible to slowly follow up the discontinuous values. FIG. 13 is a block diagram illustrating a portion of a rear-stage configuration of a double differentiator of a servo control device having another configuration according to the fifth embodiment of the present invention. FIG. 14 is a block diagram illustrating a portion of a rear-stage configuration of a differentiator of a servo control device having another configuration according to the fifth embodiment of the present invention.

As illustrated in FIG. 13, a switch 130 is connected to the double differentiator 112 instead of the switch 118. Upon receiving an abnormality detection signal from the abnormality detection unit 109, the switch 130 switches from a state in which the double differentiator 112 is connected to the adder 111 via the velocity feedforward processing unit 113 to a state in which the double differentiator 112 is connected to the adder 111 via the low-pass filter 131, maintains the state for a predetermined period, and then connects the double differentiator 112 directly to the adder 111. The predetermined period can be determined based on the time period that allows the compensation value to converge sufficiently or the time constant of the low-pass filter 131.

As illustrated in FIG. 14, a switch 132 is connected to the differentiator 115 instead of the switch 119. Upon receiving an abnormality detection signal from the abnormality detection unit 109, the switch 132 switches from a state in which the differentiator 115 is connected to the adder/subtractor 103 via the position feedforward processing unit 116 to a state in which the differentiator 115 is connected to the adder/subtractor 103 via the low-pass filter 133, maintains the state for a predetermined period, and then connects the differentiator 115 directly to the adder/subtractor 103. The predetermined period can be determined based on the time period that allows the compensation value to converge sufficiently or the time constant of the low-pass filter 133. In this manner, the switch, rather than discontinuously switching the connection between the double differentiator 112 and the adder 111, temporarily switches to a connected state via the low-pass filter 131, allowing for slow convergence. Moreover, the switch, rather than discontinuously switching the connection between the differentiator 115 and the adder/subtractor 103, temporarily switches to a connected state via the low-pass filter 133, allowing for slow convergence. FIG.

15 is a characteristic diagram illustrating the change in compensation value by a position feedforward (position FF) process or a velocity feedforward (velocity FF) process depending on the presence of a filter.

When the configuration of the present embodiment is applied to the control device of the fourth embodiment, a low-pass filter is provided at the rear stage of the compensation generation unit 122 illustrated in FIG. 9 in order to prevent discontinuity of the compensation value. By passing the compensation value through the low-pass filter, it becomes possible to slowly follow up the discontinuous values. Since the configuration of the low-pass filter and that of the switch that switches to the low-pass filter are the same as the configuration in which the velocity feedforward processing unit 113 is replaced with the compensation generation unit 122 in FIG. 10, the description thereof will be omitted.

(Sixth Embodiment)

In the control device of the fifth embodiment, a low-pass filter is provided to prevent discontinuity of a compensation value; however, rewriting of an integrator of the velocity control unit 104 may be performed instead of providing the low-pass filter, so that the torque command value output from the velocity control unit 104 becomes continuous. In the present embodiment, the low-pass filter described in the fifth embodiment may be provided as well as performing the rewriting of the integrator. In the following description, the control device of the second embodiment illustrated in FIG. 4 is described as an example; however, the description may be applied to the servo control devices of the first, third, and fourth embodiments.

Figure 16:
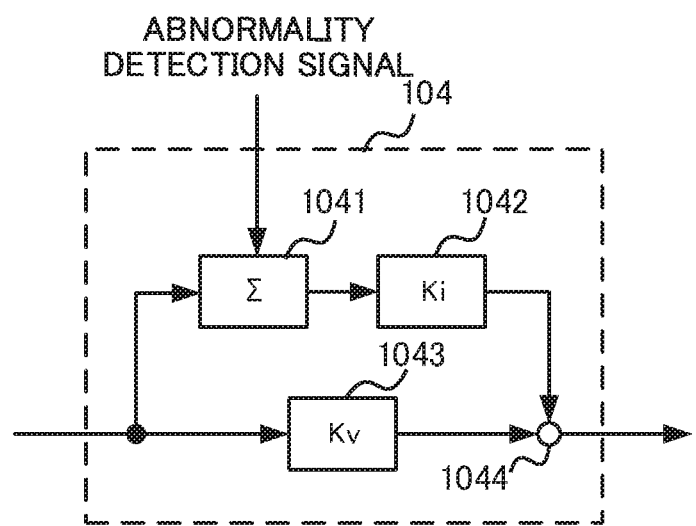
FIG. 16 is a block diagram illustrating a configuration of a velocity control unit of a servo control device according to a sixth embodiment of the present invention.

FIG. 16 is a block diagram illustrating a configuration of a velocity control unit 104 of a servo control device according to a sixth embodiment of the present invention. As illustrated in FIG. 16, an abnormality detection signal is transmitted from the abnormality detection unit 109 to an integrator 1041. As illustrated in FIG. 16, the velocity control unit 104 includes an integrator 1041 to which a velocity error having a position feedforward term added thereto is input, a multiplier 1042 that multiplies an integrated value output from the integrator 1041 by a coefficient Ki, a multiplier 1043 to which the velocity error with a position feedforward term added thereto is input and which multiplies the velocity error by a coefficient Kv, and an adder 1044 that adds the output of the multiplier 1042 and the output of the multiplier 1043 to output the result.

The abnormality detection unit 109 transmits an abnormality detection signal to the switch 105, switches the switch 105 from on to off, and transmits an abnormality detection signal to the integrator 1041. Upon receiving an abnormality detection signal, the integrator 1041 performs the following rewriting in order to prevent discontinuity of the compensation value due to the stopping of the compensation of the position feedforward term caused by the switch 105 turning off, so that the torque command value becomes continuous. When Verr is a velocity error, kp is a proportional gain, and ki is an integral gain, a torque command Tcmd(i) immediately before the position feedforward (position FF) stops is represented by Expression 4 below.

$$T\text{cmd}(i) = \Sigma_{n=0}^{i}(\text{Verr}(n)) \times ki + \text{Verr}(i) \times kp \qquad [\text{Math. 4}]$$

Further, a torque command Tcmd(i+1) immediately after the position feedforward stops is represented by Expression 5 below.

$$T\text{cmd}(i+1) = \Sigma_{n=0}^{i+1}(\text{Verr}(n)) \times ki + \text{Verr}(i+1) \times kp \qquad [\text{Math. 5}]$$

Since Verr(i+1) fluctuates greatly immediately after the position feedforward stops, discontinuity may occur between Tcmd(i) and Tcmd(i+1), resulting in a shock. Therefore, as illustrated in Expression 6, an integration term by the integrator of the torque command immediately after the position feedforward stops is rewritten as follows.

$$(\Sigma_{n=0}^{i+1}(\text{Verr}(n))) \rightarrow (T\text{cmd}(i) \cdot \text{Verr}(i+1) \times kp)/ki \qquad [\text{Math. 6}]$$

Then, a torque command Tcmd' (i+1) with the integrator rewritten is represented by Expression 7.

$$T\text{cmd}'(i) = \qquad [\text{Math. 7}]$$
$$(T\text{cmd}(i) - \text{Verr}(i+1) \times kp)/ki \times ki + \text{Verr}(i+1) \times kp =$$
$$T\text{cmd}(i)$$

Figure 17:
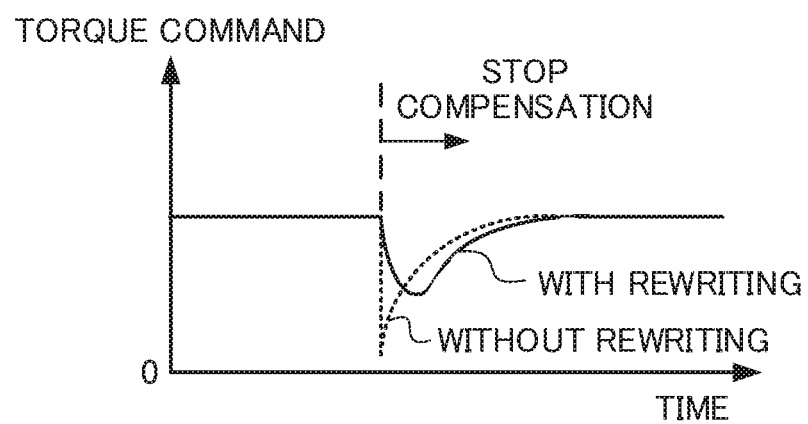
FIG. 17 is a characteristic diagram illustrating the change in torque command depending on whether the integrator is rewritten or not.

That is, with the rewriting of the integrator 1041, since Tcmd' (i+1)=Tcmd(i) and the torque command changes continuously, the shock before and after position feedforward stops disappears. The rewritten integrator 1041 performs calculation by adding Verr(n) to (Tcmd(i)−Verr(i+1)× kp)/ki. FIG. 17 is a characteristic diagram illustrating the change in torque command depending on whether the integrator is rewritten or not.

While respective embodiments of the present invention have been described, the servo control unit of the servo control device described above and the components included in the machine learning device may be realized by hardware, software or a combination thereof. The servo control method performed by cooperation of each of the components included in the servo control device described above may also be realized by hardware, software, or a combination thereof. Here, being realized by software means being realized by a computer reading and executing a program.

The programs can be stored on any of various types of non-transitory computer readable media and be provided to a computer. The non-transitory computer readable media include various types of tangible storage media. Examples of the non-transitory computer readable media include a magnetic recording medium (such as a flexible disk or a hard disk drive), a magneto-optical recording medium (such as a magneto-optical disk), a CD-ROM (Read Only Memory), a CD-R, a CD-R/W, a semiconductor memory (such as a mask ROM, a PROM (Programmable ROM), an EPROM (Erasable PROM), a flash ROM, or a RAM (Random Access Memory)).

The above-described embodiments are preferred embodiments of the present invention; however, the scope of the present invention is not limited to the embodiments only, and the present invention can be embodied in various modifications without departing from the spirit of the present invention.

<Modification in which the Servo Control Device Includes a Machine Learning Device>

In the above-described embodiments, the machine learning device 200 and the servo control device 100, 100A, 100B, or 100C are configured to be provided in the control device, and the machine learning device 200 and the servo control device 100, 100A, 100B, or 100C are configured as separate devices; however, some or all of the functions of the machine learning device 200 may be realized by the servo control device 100. In the above-described embodiments, the servo control device 100, 100A, 100B, or 100C and the numerical controller 400 are configured as separate devices; however, some or all of the functions of the servo control device 100, 100A, 100B, or 100C may be realized by the numerical controller 400. The numerical controller 400 may include the machine learning device 200 and the servo control device 100, 100A, 100B, or 100C, and in this case, the numerical controller 400 forms a control device.

<Freedom in System Configuration>

Figure 18:
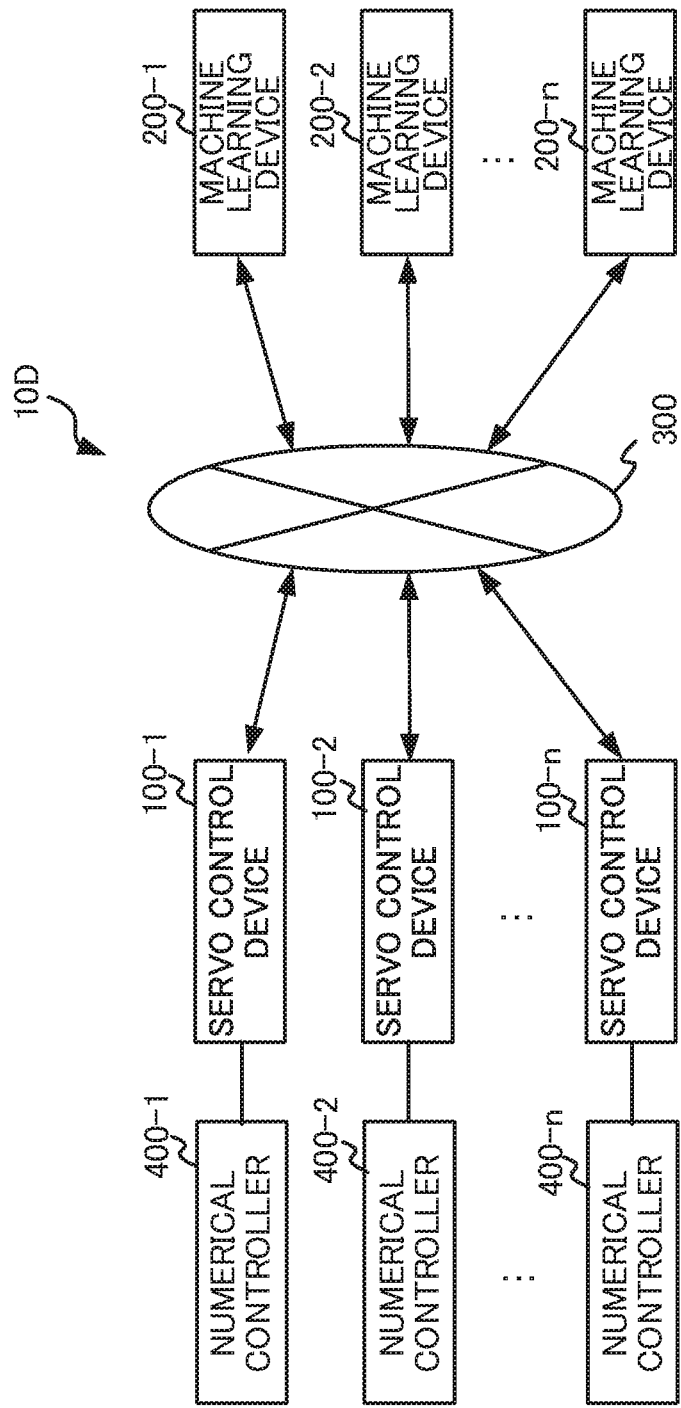
FIG. 18 is a block diagram illustrating a control device according to another embodiment of the present invention.

FIG. 18 is a block diagram illustrating a control device according to another embodiment of the present invention. As illustrated in FIG. 18, a control device 10D includes n servo control devices 100-1 to 100-n, n machine learning devices 200-1 to 200-n, a network 300, and numerical controllers 400-1 to 400-n.

n is a freely selected natural number. Each of the n servo control devices 100-1 to 100-n corresponds to any one of the servo control devices 100 and 100A to 100C illustrated in FIGS. 1, 7, 8, and 9. Each of the n machine learning devices 200-1 to 200-n corresponds to any one of the machine learning devices 200 illustrated in FIGS. 1, 7, 8, and 9. The numerical controllers 400-1 to 400-n correspond to the numerical controller 400 and are provided in the servo control devices 100-1 to 100-n, respectively. The servo control devices 100-1 to 100-n may be included in the numerical controllers 400-1 to 400-n, respectively.

Here, the servo control device 100-1 and the machine learning device 200-1 are paired in a one-to-one relationship and are communicably connected. The servo control device 100-2 to 100-n and the machine learning devices 200-2 to 200-n are connected in a similar manner to the servo control device 100-1 and the machine learning device 200-1. Although the n pairs of the servo control devices 100-1 to 100-n and the machine learning device 200-1 to 200-n are connected via the network 300 in FIG. 18, the n pairs of the servo control devices 100-1 to 100-n and the machine learning devices 200-1 to 200-n may be connected directly via connection interfaces, respectively. A plurality of n pairs of the servo control devices 100-1 to 100-n and the machine learning devices 200-1 to 200-n may be, for example, provided in the same plant or may be provided in different plants, respectively.

The network 300 is, for example, a local area network (LAN) constructed in a plant, the Internet, a public telephone network, or a combination thereof. The specific communication scheme of the network 300, as well as whether the network uses a cable connection or a wireless connection, and the like are not particularly limited.

In the control device illustrated in FIG. 18, the machine learning devices 200-1 to 200-n and the servo control devices 100-1 to 100-n are communicably connected as a one-to-one correspondence; however, one machine learning device 200-1 may be communicably connected to a plurality of servo control devices 100-1 to 100-m (m<n or m=n; m and n are natural numbers) via the network 300, and may perform machine learning of the servo control devices 100-1 to 100-m.

m and n used herein are values which are not related to m and n used in Expressions 1 and 3. In this case, a distributed processing system may be adopted, in which the respective functions of the machine learning device 200-1 are distributed to a plurality of servers as appropriate. The functions of the machine learning device 200-1 may be realized by utilizing a virtual server function, or the like, in a cloud. When there is a plurality of machine learning devices 200-1 to 200-n respectively corresponding to a plurality of servo control devices 100-1 to 100-n of the same type name, the same specification, or the same series, the machine learning devices 200-1 to 200-n may be configured to share the learning results in the machine learning devices 200-1 to 200-n. By doing so, a further optimal model can be constructed.

EXPLANATION OF REFERENCE NUMERALS 10, 10A to 10D: Control device
100, 100A to 100C: Servo control device
101: Subtractor
102: Position control unit
103: Adder/subtractor
104: Velocity control unit
111: Adder
106: Motor
107: Integrator
108: Position detection processing unit
109, 124: Abnormality detection unit
112: Double differentiator
113: Velocity feedforward processing unit
114, 105, 123: Switch
115: Differentiator
116: Position feedforward processing unit
117, 125: Informing unit
121: Reversal detection unit
122: Compensation generation unit
200: Machine learning device
201: State information acquisition unit
202: Learning unit
203: Action information output unit
204: Value function storage unit
205: Optimization action information output unit
300: Network

What is claimed is:

1. A control device comprising:
a servo control device configured to control a servo motor configured to drive an axis of a machine tool, a robot, or an industrial machine, the servo control device including (i) at least one feedback loop, (ii) a compensation generation unit configured to generate a compensation value, the compensation value to be applied to the feedback loop, and (iii) an abnormality detection unit configured to detect an abnormal operation of the servo motor; and
a machine learning device configured to perform machine learning related to optimization of the compensation value with respect to the servo control device, based on a command to the feedback loop and information in the feedback loop, wherein
during a machine learning operation, when the abnormality detection unit detects an abnormality, the application of the compensation value to the feedback loop from the compensation generation unit is stopped and the machine learning device continues the machine learning related to optimization of the compensation value generated by the compensation generation unit.

2. The control device according to claim 1, wherein
the servo control device includes a switch provided between the feedback loop and the inside of the compensation generation unit or a rear stage of the compensation generation unit, and when the abnormality detection unit detects an abnormal operation, the abnormality detection unit turns off the switch and notifies the machine learning device that the compensation to the feedback loop is stopped, and
upon receiving the notification that the compensation to the feedback loop is stopped, the machine learning device applies the compensation value to the learning.

3. The control device according to claim 2, wherein
the servo control device includes a low-pass filter provided at a rear stage of the switch, and passes the compensation value through the low-pass filter upon switching by the switch.

4. The control device according to claim 2, wherein
the feedback loop includes a velocity control unit having an integrator configured to integrate a velocity error, and
the integrator is rewritten upon switching by the switch.

5. The control device according to claim 1, wherein
the machine learning device performs reinforcement learning as the machine learning, and
when the compensation stop notification is received from the abnormality detection unit, the machine learning device offers a reward such that the compensation value with which an abnormal operation occurs would not be selected.

6. The control device according to claim 5, wherein
the machine learning device updates a value function based on the reward, generates the optimal compensation value or adjustment information of compensation parameters based on the updated value function, and outputs to the compensation generation unit.

7. The control device according to claim 1, wherein
the abnormality detection unit detects an abnormality when a position error or a torque command or both is equal to or larger than a predetermined threshold.

8. The control device according to claim 1, wherein
the servo control device further includes an informing unit configured to inform of detection of an abnormality when an abnormality is detected by the abnormality detection unit.

9. The control device according to claim 1, wherein
the at least one feedback loop includes at least one of a position feedback loop and a velocity feedback loop, and the compensation generation unit includes at least one of a position feedforward processing unit configured to add a position feedforward term to the position feedback loop and a velocity feedforward processing unit configured to add a velocity feedforward term to the velocity feedback loop.

10. The control device according to claim 1, wherein
the at least one feedback loop is a position feedback loop, and the compensation generation unit generates compensation during reversal of the servo motor.

11. The control device according to claim 1, wherein
the machine learning device is included in the servo control device.

12. A control method of a control device, the control device comprising:
a servo control device configured to control a servo motor configured to drive an axis of a machine tool, a robot, or an industrial machine, the servo control device being configured to generate a compensation value, the compensation value to be applied to at least one feedback loop of the servo control device, and the servo control device being configured to detect an abnormal operation of the servo motor; and
a machine learning device configured to perform machine learning related to optimization of the compensation value with respect to the servo control device, based on a command to the at least one feedback loop and information in the at least one feedback loop, wherein
during a machine learning operation, when the servo control device detects an abnormality, the application of the compensation value to the at least one feedback loop is stopped, and the machine learning device continues the machine learning related to optimization of the compensation value.

* * * * *